United States Patent
Tie et al.

(10) Patent No.: US 8,689,283 B2
(45) Date of Patent: Apr. 1, 2014

(54) SECURITY ACCESS CONTROL METHOD AND SYSTEM FOR WIRED LOCAL AREA NETWORK

(75) Inventors: Manxia Tie, Shaanxi (CN); Jun Cao, Shaanxi (CN); Li Ge, Shaanxi (CN); Xiaolong Lai, Shaanxi (CN); Zhenhai Huang, Shaanxi (CN); Qin Li, Shaanxi (CN); Zhiqiang Du, Shaanxi (CN)

(73) Assignee: China Iwncomm Co., Ltd., Xi'an (CN)

( * ) Notice: Subject to any disclaimer, the term of this patent is extended or adjusted under 35 U.S.C. 154(b) by 60 days.

(21) Appl. No.: 13/391,051

(22) PCT Filed: Dec. 23, 2009

(86) PCT No.: PCT/CN2009/075895
§ 371 (c)(1),
(2), (4) Date: Feb. 17, 2012

(87) PCT Pub. No.: WO2011/020274
PCT Pub. Date: Feb. 24, 2011

(65) Prior Publication Data
US 2012/0151554 A1    Jun. 14, 2012

(30) Foreign Application Priority Data
Aug. 19, 2009    (CN) .......................... 2009 1 0023628

(51) Int. Cl.
*H04L 29/06*    (2006.01)

(52) U.S. Cl.
USPC ................................. 726/1; 726/11; 455/466

(58) Field of Classification Search
USPC ........................................ 726/1, 11; 455/466
See application file for complete search history.

(56) References Cited

U.S. PATENT DOCUMENTS 7,516,485 B1 *   4/2009   Lee et al. ........................ 726/11

7,975,140 B2 *   7/2011   Fedyk et al. .................. 713/171
(Continued)

FOREIGN PATENT DOCUMENTS

| CN | 101132280 A | 2/2008 |
|---|---|---|
| CN | 101227362 A | 7/2008 |

(Continued)

OTHER PUBLICATIONS

Carstens, "Wireless Access Network Selection in Heterogenous Network for Multimode Terminals", Dec. 2006, SIEMENS AG, p. 1-7.*

(Continued)

*Primary Examiner* — Taghi Arani
*Assistant Examiner* — Gregory Lane
(74) *Attorney, Agent, or Firm* — Harness, Dickey & Pierce, P.L.C.

(57) ABSTRACT

The present invention relates to a security access control method and system for wired local area network, the method includes the following steps: 1) a requester (REQ) negotiates the security policy with an authentication access controller (AAC); 2) the requester (REQ) and the authentication access controller (AAC) authenticate the identity; 3) the requester (REQ) negotiates the key with the authentication access controller (AAC). The direct identity authentication between the user and the network access control device is realized by the present invention; the negotiation and the dynamic update of the session key for the link layer data protection are realized; a variety of network architectures such as the enterprise network, the telecommunication network are supported; the scalability is good, the multiple authentication methods are supported; the authentication protocols with different security levels are supported, the requirements of the various subscribers are satisfied; the sub-modules of the protocol are independent, flexible, and easy to be accepted or rejected.

13 Claims, 2 Drawing Sheets

(56) References Cited

U.S. PATENT DOCUMENTS

| | | | |
|---|---|---|---|
| 7,996,888 B2 * | 8/2011 | Asunmaa et al. | 726/9 |
| 2003/0167336 A1 * | 9/2003 | Iwamoto et al. | 709/229 |
| 2006/0227807 A1 * | 10/2006 | Jakubik et al. | 370/466 |
| 2006/0276209 A1 * | 12/2006 | Neves et al. | 455/466 |
| 2008/0069351 A1 | 3/2008 | Walker et al. | |
| 2009/0276828 A1 * | 11/2009 | Swander et al. | 726/1 |
| 2010/0293378 A1 | 11/2010 | Xiao et al. | |
| 2011/0191579 A1 | 8/2011 | Xiao et al. | |

FOREIGN PATENT DOCUMENTS

| | | |
|---|---|---|
| CN | 101242267 A | 8/2008 |
| CN | 101447992 A | 6/2009 |
| JP | 2006243791 A | 9/2006 |
| WO | WO-2008036694 A2 | 3/2008 |
| WO | WO-2009094941 A1 | 8/2009 |

OTHER PUBLICATIONS

IEEE Standard for Information Technology—Telecommunications and information exchange between systems—Local and metropolitan area networks—Specific Requirements. Part 3: Carrier sense multiple access with collision detection (CSMA/CD) access method and physical layer specifications. Sections 1 and 3-5. IEEE Computer Society. Sponsored by the LAN/MAN Standards Committee. IEEE Standard 802.3—2005. Dec. 9, 2005.

International Search Report for PCT/CN2011/020274 A1, ISA/CN, Beijing, mailed May 27, 2010.

Port-Based Network Access Control, IEEE Std. 802.1X$^{TM}$ (Revision of IEEE Std. 802.1X-2001), IEEE, Dec. 13, 2004, New York, NY.

* cited by examiner

SECURITY ACCESS CONTROL METHOD AND SYSTEM FOR WIRED LOCAL AREA NETWORK

CROSS-REFERENCE TO RELATED APPLICATIONS

This application is a national stage application of PCT/CN2009/075895 filed on Dec. 23, 2009, which claims the benefit of Chinese patent application No. 200910023628.2 titled "SECURITY ACCESS CONTROL METHOD FOR WIRED LOCAL AREA NETWORK AND SYSTEM THEREOF" and filed with the State Intellectual Property Office on Aug. 19, 2009. Both the international application and the Chinese application are incorporated herein by reference in their entireties.

FIELD OF THE INVENTION

The present invention relates to a security access control method for a wired local area network and a system thereof, and in particular to a Tri-element Peer Authentication (TePA) based security access control method for accessing a wired Local Area Network (LAN), also known as Tri-element LAN Access Control (TLAC), and a system thereof.

BACKGROUND OF THE INVENTION

TePA is a technological idea and framework for peer authentication between a terminal and a network originally developed by China. This technology defines a tri-element entity authentication architecture, which realizes mutual authentication between a user and a network based on a peer authentication idea.

Currently, in a wired local area network, IEEE uses security-enhanced IEEE 802.3 to realize the security of the link layer, including the typical security access protocol IEEE 802.1x and IEEE 802.1x authentication based key management protocols. The basic method of IEEE 802.1x authentication includes an additional authentication server to the terminal and the access point device, and the access point device using the authentication server to authenticate the identity of the terminal, thereby realizing security access control of the terminal. The access point device forwards directly authentication information between the terminal and the authentication server, without participating in the identity authentication process as an independent entity. This method can only achieve validity authentication of the identity of the terminal by the network, but cannot meet the requirement of validity authentication of the identity of the access network by the terminal, thereby failing to realize mutual authentication between the terminal and the network. The terminal cannot verify the identity of the access point device, and even if security vulnerabilities are remedied by such measures as adding security patches to this type of security architecture subsequently, security problems such as man-in-the-middle attacks and the terminal accessing an invalid network cannot be avoided. This type of security access protocol is still in use, and presents a serious obstacle to the development of the industry.

SUMMARY OF THE INVENTION

In order to solve the above technical problems in the background of the invention, it is provided according to the present invention a security access control method for a wired local area network and a system thereof, which can realize mutual (unilateral) authentication between a user and a network and also realize key negotiation for the secret communication between a terminal and a network device.

The technical solution of the present invention includes a security access control method for a wired local area network, characterized in that the method includes the following steps:

step 1, performing security policy negotiation between a requester (REQ) and an authentication access controller (AAC); and step 2, performing identity authentication between the REQ and the AAC.

The method may further include:

step 3, performing key negotiation between the REQ and the AAC.

Specifically, step 1 may include:

step 11, security policy negotiation requesting:

when the REQ accesses the AAC, the AAC sends a security policy negotiation request message to the REQ, the security policy negotiation request message including $TIE_{AAC}$, wherein, the $TIE_{AAC}$ field indicates an information element of tri-element peer authentication (TePA) supported by the AAC, including an authentication and key management suite and a cryptography suite supported by the AAC;

step 12, security policy negotiation responding:

on receipt of the security policy negotiation request message, the REQ performs the following:

selecting an authentication and key management suite and a cryptography suite that are commonly owned by the REQ and the AAC according to the authentication and key management suite and the cryptography suite supported by the AAC indicated by the $TIE_{AAC}$ field in the security policy negotiation request message in conjunction with a local policy, and forming a security policy negotiation response message and sending it to the AAC; discarding the security policy negotiation request message according to a local policy if the REQ does not support any of the authentication and key management suite and the cryptography suite supported by the AAC in the security policy negotiation request message, the security policy negotiation response message including $TIE_{REQ}$, wherein, the $TIE_{REQ}$ field indicates a TePA information element selected by the REQ, including the authentication and key management suite and the cryptography suite selected by the REQ;

step 13, on receipt of the security policy negotiation response message, the AAC performs the following:

step 131, determining whether the AAC supports the authentication and key management suite and the cryptography suite selected by the REQ; if not, discarding the security policy negotiation response message, and if so, go to step 132;

step 132, starting a corresponding identity authentication process according to the authentication and key management suite selected by the REQ.

In step 13, if the authentication and key management suite selected by the REQ is a certificate-based authentication and key management suite, the identify authentication process may use a certificate-based authentication protocol Triple-element Authentication Extensible Protocol Certificate-based 1 An Authentication Protocol (TAEP-CAAP).

Specifically, step 2 may include:

step 21, authentication activation:

the AAC sends an authentication activation message to the REQ to activate the REQ to perform certificate authentication, the authentication activation message including SNonce, $\text{IDA}_{AS\text{-}AAC}$, $\text{Cert}_{AAC}$, $\text{Para}_{ECDH}$, $\text{TIE}_{AAC}$ and $\text{SIG}_{AAC}$;

wherein, the SNonce field indicates an authentication identifier, and is a random number generated by the AAC if the identify authentication process is performed for the first time; or an authentication identifier value generated from negotiation during the last identify authentication process if the current identify authentication process is an updating process;

the $\text{ID}_{AS\text{-}AAC}$ field indicates an identity ID of an authentication server (AS) trusted by the AAC, which is an ID of the AS who issued a certificate of the AAC ($\text{Cert}_{AAC}$);

the $\text{Cert}_{AAC}$ field indicates the certificate of the AAC;

the $\text{Para}_{ECDH}$ field indicates an elliptic curve cryptography parameter of an elliptic curve cryptography mechanism, which is an elliptic curve cryptography parameter used during calculation of Elliptic Curve Diffie-Hellman (ECDH) by the REQ and the AAC;

the $\text{TIE}_{AAC}$ field indicates an authentication and key management suite and a cryptography suite supported by the AAC, and has a value the same as the value of the $\text{TIE}_{AAC}$ field in the security policy negotiation request message;

the $\text{SIG}_{AAC}$ field indicates a signature by the AAC, which is a signature signed by the AAC using a private key on all the other fields except the $\text{SIG}_{AAC}$ field in the authentication activation message; the $\text{SIG}_{AAC}$ field is an optional field;

step 22, access authentication request:

on receipt of the authentication activation message, the REQ performs the following:

step 221, if the current identity authentication process is an updating process, the REQ checks whether the authentication identifier field value in the authentication activation message is in accordance with the authentication identifier saved during the last identity authentication process, if not, discards the authentication activation message, otherwise, go to step 222; if the current identity authentication process is not an updating process but an identity authentication process for the first time, go to step 222 directly;

step 222, the REQ verifies whether the $\text{TIE}_{AAC}$ field value is in accordance with the $\text{TIE}_{AAC}$ field value in the security policy negotiation request message received during the security policy negotiation; if not, discards the authentication activation message, if so, go to step 223;

step 223, if the $\text{SIG}_{AAC}$ field is included in the received authentication activation message, the REQ verifies correctness of the $\text{SIG}_{AAC}$ field; if the $\text{SIG}_{AAC}$ field is incorrect, discards the received authentication activation message, if the $\text{SIG}_{AAC}$ field is correct, go to step 224; if no $\text{SIG}_{AAC}$ field is included in the received authentication activation message, go directly to step 224;

step 224, the REQ selects a certificate of the REQ issued by the AS ($\text{Cert}_{REQ}$) according to the $\text{ID}_{AS\text{-}AAC}$ field in the authentication activation message or selects a certificate of the REQ ($\text{Cert}_{REQ}$) according to a local policy; generates REQ key data x·P and a REQ challenge ($\text{N}_{REQ}$) for ECDH exchange; generates an access authentication request message and sends it to the AAC, the access authentication request message including SNonce, $\text{N}_{REQ}$, x·P, $\text{ID}_{AAC}$, $\text{Cert}_{REQ}$, $\text{Para}_{ECDH}$, $\text{List}_{AS\text{-}REQ}$, $\text{TIE}_{REQ}$ and $\text{Sig}_{REQ}$;

wherein, the SNonce field indicates an authentication identifier and has a value the same as the value of the SNonce field in the authentication activation message; if the identify authentication process is performed for the first time, the value of the SNonce field is determined directly by the value of the SNonce field in the authentication activation message; if the current identify authentication process is an updating process, the value of the SNonce field is the authentication identifier value calculated during the last identity authentication process;

the $\text{N}_{REQ}$ field indicates a REQ challenge, which is a random number generated by the REQ;

the x·P field indicates key data of the REQ, which is a temporary public key generated by the REQ for ECDH exchange;

the $\text{ID}_{AAC}$ field indicates an identity ID of the AAC, and is obtained according to the $\text{Cert}_{AAC}$ field in the authentication activation message;

the $\text{Cert}_{REQ}$ field indicates a certificate of the REQ;

the $\text{Para}_{ECDH}$ field indicates an ECDH parameter, which is an elliptic curve cryptography parameter used during ECDH calculation by the REQ and the AAC; and has a value the same as the value of the $\text{Para}_{ECDH}$ field in the authentication activation message;

the $\text{List}_{AS\text{-}REQ}$ field indicates a list of ASs trusted by the REQ, not including an issuer of the certificate of the REQ ($\text{Cert}_{REQ}$); the AAC is notified of by the REQ using the $\text{List}_{AS\text{-}REQ}$ field when the REQ trusts an entity other than the issuer of its certificate; the $\text{List}_{AS\text{-}REQ}$ field is an optional field;

the $\text{TIE}_{REQ}$ field indicates an authentication and key management suite and a cryptography suite selected by the REQ, and has a value the same as the value of the $\text{TIE}_{REQ}$ field in the security policy negotiation response message;

the $\text{Sig}_{REQ}$ field indicates a signature by the REQ, which is a signature signed by the REQ using a private key on all the other fields except the $\text{Sig}_{REQ}$ field in the access authentication request message;

step 23, certificate authentication requesting:

on receipt of the access authentication request message, the AAC performs the following:

step 231, if the AAC has sent the authentication activation message, the AAC checks whether the SNonce field value and the $\text{Para}_{ECDH}$ field value in the received access authentication request message are in accordance with the corresponding field values in the authentication activation message, if any of the SNonce field value and the $\text{Para}_{ECDH}$ field value is not, discards the access authentication request message, otherwise, got to step 232; if the AAC has not sent the authentication activation message, the AAC checks whether the SNonce field value is in accordance with the authentication identifier calculated during the last certificate authentication process and whether the $\text{Para}_{ECDH}$ field is in accordance with the $\text{Para}_{ECDH}$ field in the last authentication activation message, if any of the SNonce field value and the $\text{Para}_{ECDH}$ field is not, discards the access authentication request message, otherwise, go to step 232;

step 232, the AAC checks whether the $\text{ID}_{AAC}$ is in accordance with the identity of the AAC itself and whether the $\text{TIE}_{REQ}$ field value is in accordance with the $\text{TIE}_{REQ}$ field value in the security policy negotiation response message received during the security policy negotiation; if any of the $\text{ID}_{AAC}$ and the $\text{TIE}_{REQ}$ field value is not, discards the access authentication request message; otherwise, go to step 233;

step 233, the AAC verifies correctness of the $\text{Sig}_{REQ}$ field; if the $\text{Sig}_{REQ}$ field is incorrect, discards the access authentication request message; otherwise, go to step 234;

step 234, if it is required according to a local policy of the AAC to use the AS to authenticate the certificate of the REQ ($\text{Cert}_{REQ}$), the AAC generates a certificate authentication request message and sends it to the AS; otherwise, go to step 235;

step 235, the AAC authenticates the certificate of the REQ ($\text{Cert}_{REQ}$) locally, which includes validating a verification result of the certificate of the REQ ($Cert_{REQ}$) according to a verification result of the certificate of the REQ ($Cert_{REQ}$) cached locally and timeliness defined by a local policy; if the verification result of the $Cert_{REQ}$ is valid, generates locally key data and an AAC challenge ($N_{AAC}$) for ECDH exchange, the key data including a temporary public key y·P of the AAC, performs ECDH calculation according to the temporary public key x·P of the REQ and a temporary private key y of the AAC to obtain a base key (BK) and an authentication identifier for the next identity authentication process and store them, sets an access result to be successful, forms an access authentication response message and sends it to the REQ, and permits a user to access the network; if the verification result of the $Cert_{REQ}$ is invalid, the AAC sets the access result to be unsuccessful and the AAC challenge ($N_{AAC}$) and the key data y·P to be any values, forms an access authentication response message and sends it to the REQ, and removes association with the REQ, the certificate authentication request message includes: $N_{AAC}$, $N_{REQ}$, $Cert_{REQ}$, $Cert_{AAC}$ and $List_{AS-REQ}$;

wherein, the $N_{AAC}$ field indicates an AAC challenge, which is a random number generated by the AAC;

the $N_{REQ}$ field indicates REQ challenge, which is a random number generated by the REQ, and has a value the same as the value of the $N_{REQ}$ field in the access authentication request message sent by the REQ;

the $Cert_{REQ}$ field indicates a certificate of the REQ and has a value the same as the value of the $Cert_{REQ}$ field in the access authentication request message;

the $Cert_{AAC}$ field indicates a certificate of the AAC and has a value the same as the value of the $Cert_{AAC}$ field in the authentication activation message;

the $List_{AS-REQ}$ field indicates a list of ASs trusted by the REQ and has a value the same as the value of the $List_{AS-REQ}$ field in the access authentication request message sent by the REQ; the $List_{AS-REQ}$ field is an optional field;

step 24, certificate authentication responding:

on receipt of the certificate authentication request message, the AS performs the following:

step 241, in the case of unilateral authentication, the AS verifies the certificate of the REQ ($Cert_{REQ}$); in the case of mutual authentication, the AS verifies both the certificate of the AAC ($Cert_{AAC}$) and the certificate of the REQ ($Cert_{REQ}$), the verification of the certificates are performed with reference to RFC3280, and if the verification cannot be performed, the AS sets a verification result of a corresponding certificate to be issuer of the certificate undefined, otherwise, the AS verifies the certificate and performs step 242;

step 242, the AS forms a certificate authentication response message according to the verification result of the certificate; adds a corresponding signature and sends the certificate authentication response message to the AAC, the certificate authentication response message including $RES_{Cert}$, $SIG_{AS-REQ}$ and $SIG_{AS-AAC}$, wherein the $RES_{Cert}$ field indicates the verification result of the certificate and includes an AAC challenge value ($N_{AAC}$), a REQ challenge value ($N_{REQ}$), the verification result of the $Cert_{AAC}$ and the verification result of the $Cert_{REQ}$; in case of unilateral verification, the $RES_{Cert}$ field does not include the verification result of the certificate of the AAC ($Cert_{AAC}$);

the $SIG_{AS-REQ}$ field indicates a signature signed by the AS trusted by the REQ on the verification result of the certificate ($RES_{Cert}$) in the certificate authentication response message;

the $SIG_{AS-AAC}$ field indicates a signature signed by the AS trusted by the AAC on all the other fields in the certificate authentication response message except the $SIG_{AS-AAC}$ field; the $SIG_{AS-AAC}$ field is an optional field, and is omitted if the AS who signed the verification result of the certificate is the same as the AS trusted by the AAC;

step 25. access authentication responding:

on receipt of the certificate authentication response message, the AAC performs the following:

step 251, the AAC checks whether the AAC challenge ($N_{AAC}$) field value in the $RES_{Cert}$ field is the same as the $N_{AAC}$ field value in the certificate authentication request message; if not, discards the certificate authentication response message, if so, go to step 252;

step 252, if two signature fields are included in the certificate authentication response message, the AAC checks whether the $SIG_{AS-AAC}$ field is correct, if not, discards the certificate authentication response message, if so, go to step 253; if only one signature field is included in the certificate authentication response message, which indicates that the AS trusted by the REQ is also the AS trusted by the AAC, the AAC checks whether the $SIG_{AS-REQ}$ field is correct, if not, discards the certificate authentication response message, if so, go to step 253;

step 253, the AAC checks whether the verification result of the $Cert_{REQ}$ in the $RES_{Cert}$ field is valid; if so, generates locally key data y·P and an AAC challenge ($N_{AAC}$) for ECDH exchange, performing ECDH calculation according to the temporary public key x·P of the REQ and a temporary private key y of the AAC to obtain a base key (BK) and an authentication identifier for the next identity authentication process and store them, sets an access result to be successful, forms an access authentication response message and sends it to the REQ, and permits a user to access the network; if the verification result of the $Cert_{REQ}$ is invalid, the AAC sets the access result to be unsuccessful, the AAC challenge ($N_{AAC}$) and the private data y·P to be any value, forms an access authentication response message and sends it to the REQ, and remove association with the REQ, the access authentication response message including $N_{REQ}$, $N_{AAC}$, $Acc_{RES}$, x·P, y·P, $ID_{AAC}$, $ID_{REQ}$, $MRES_{Cert}$ and $SIG_{AAC}$ or MIC1, wherein, the $N_{REQ}$ field indicates a REQ challenge, which is a random number generated by the REQ; the $N_{REQ}$ field is an optional field, it is included in the access authentication response message only in the case of unilateral authentication; and if the $N_{REQ}$ field exists, it has a value the same as the value of the $N_{REQ}$ field in the access authentication request message sent by the REQ;

the $N_{AAC}$ field indicates an AAC challenge, which is a random number generated by the AAC; the $N_{AAC}$ field is an optional field, it is included in the access authentication response message only in the case of unilateral authentication; and if the $N_{AAC}$ field exists, it has a value the value of the $N_{AAC}$ field in the access authentication request message sent by the AAC;

the $Acc_{RES}$ field indicates an access result, which is access success or access failure and a reason of the failure set by the AAC according to the authentication result;

the x·P field indicates key data of the REQ, which is a temporary public key generated by the REQ for ECDH exchange; the x·P field has a value the same as the value of the x·P field in the access authentication request message sent by the REQ;

the y·P field indicates key data of the AAC, which is a temporary public key generated by the AAC for ECDH exchange;

the $ID_{AAC}$ field indicates an identity ID of the AAC and is obtained according to the $Cert_{AAC}$ field;

the $ID_{REQ}$ field indicates an identity ID of the REQ and is obtained according to the $Cert_{REQ}$ field in the received access authentication request message;

the $MRES_{Cert}$ field indicates a combined certificate verification result; the $MRES_{Cert}$ field is an optional field, it is included in the access authentication response message only in the case of unilateral authentication; if the $MRES_{Cert}$ field exists, it includes the fields in the certificate authentication response message and the same values;

the $SIG_{AAC}$ field indicates a signature of the AAC, which is a signature signed by the AAC using a private key of the AAC on all the other fields except the $SIG_{AAC}$ field in the access authentication response message;

the MIC1 field indicates a message authentication code, which is a hash value of all the other fields except the MIC1 field in the access authentication response message and an authentication identifier for the next certificate authentication process calculated by the AAC using the BK generated from negotiation during the authentication;

the access authentication response message includes one or more of the $SIG_{AAC}$ field and the MIC1 field; if the authentication activation message exists in the current identity authentication process and if the access authentication activation message includes the $SIG_{AAC}$ field, the authentication response message includes only the MIC1 field; if no authentication activation message exists in the current identity authentication or if the authentication activation message does not include a $SIG_{AAC}$ field, the access authentication response message includes only the $SIG_{AAC}$ field;

step 26, access authentication confirmation:

on receipt of the access authentication response message, the REQ performs the following:

step 261, the REQ determines whether the received access authentication response message corresponds to the current access authentication request message according to the $ID_{AAC}$ field and the $ID_{REQ}$ field in the access authentication response message; if not, discards the received access authentication response message; if so, go to step 262;

step 262, the REQ determines whether the REQ key data field x·P value in the access authentication response message is in accordance with the x·P field value in the access authentication request message sent by the REQ itself; if not, discards the access authentication response message, otherwise, go to step 263;

step 263, in the case of unilateral authentication, the REQ determines whether the $N_{REQ}$ field value is in accordance with the $N_{REQ}$ field value in the access authentication request message sent previously; if not, discards the access authentication response message, otherwise, go to step 264; in the case of mutual authentication, go directly to step 264;

step 264, the REQ checks the $Acc_{RES}$ field in the access authentication response message; if the access result is unsuccessful, removes association with the AAC, otherwise, go to step 265;

step 265, if the received access authentication response message includes the $SIG_{AAC}$ field, the REQ verifies correctness of the $SIG_{AAC}$ field, if the $SIG_{AAC}$ is incorrect, discards the access authentication response message, otherwise, go to step 266; if the received access authentication response message includes the MIC1 field, the REQ verifies correctness of the MIC1 field, if the MIC1 field is incorrect, discards the access authentication response message, otherwise, go to step 266;

step 266, in the case of unilateral authentication, go to step 268; otherwise, the REQ verifies whether the $N_{REQ}$ field value included in the $MRES_{Cert}$ field is in accordance with the $N_{REQ}$ field value in the access authentication request message sent by the REQ itself, if not, discards the access authentication response message, if so, verifies whether the $SIG_{AS\text{-}REQ}$ is correct, if not, discards the access authentication response message, if so, go to step 267;

step 267, the REQ verifies whether the AAC certificate verification result in the $MRES_{Cert}$ field is valid; if not, it is determined that the network is invalid and should not be accessed, otherwise, it is determined that the network is valid and can be accessed, and go to step 268;

step 268, the REQ performs ECDH calculation according to the temporary public key y·P of the AAC and the temporary private key x of the REQ to obtain a BK and an authentication identifier for the next certificate authentication process, and stores the BK and the authentication identifier;

step 269, if the received access authentication response message includes the $SIG_{AAC}$ field, sending an access authentication confirmation message is optional; if the received access authentication response message includes the MIC1 field, the REQ forms an access authentication confirmation message and sends it to the AAC, the access authentication confirmation message including MIC2, wherein, the MIC2 field indicates a message authentication code, which is a hash value of the AAC challenge value ($N_{AAC}$), the REQ challenge value ($N_{REQ}$) and an authentication identifier for the next certificate authentication process calculated by the REQ using the BK generated from negotiation during the authentication.

In step 26, if the $SIG_{AAC}$ field is included in the access authentication response message sent by the AAC, the AAC may wait to receive the access authentication confirmation message after sending the access authentication response message to the REQ.

In step 26, on receipt of the access authentication confirmation message sent by the REQ, the AAC may verify correctness of the MIC2 field in the access authentication confirmation message, if the MIC2 field is correct, then the REQ has a BK in accordance with the AAC; if the MIC2 field is incorrect, the AAC discards the access authentication response message.

In step 3, the key negotiation between the REQ and the AAC may include a unicast key negotiation process and a multicast key notification process, and the unicast key negotiation process in the key negotiation may include:

step 31, unicast key negotiation requesting:

after the AAC and the REQ complete the identity authentication processes, the AAC sends a unicast key negotiation request message to the REQ to start a unicast key negotiation process with the REQ, the unicast key negotiation request message including $N_{AAC}$ and MIC3;

wherein, the $N_{AAC}$ field indicates an challenge of the AAC, which is a random number generated by the AAC if the unicast key negotiation process is performed for the first time; or has a value the same as the $N_{AAC}$ field saved during the last unicast key negotiation process if the current unicast key is an updating process of a unicast key;

the MIC3 field indicates a message authentication code, which is a hash value calculated by the AAC by using a BK commonly owned by the AAC and the REQ;

step 32, unicast key negotiation responding:

on receipt of the unicast key negotiation request message, the REQ performs the following:

step 321, if the current key negotiation process is an updating process of a unicast key, the REQ checks whether the $N_{AAC}$ field in the unicast key negotiation request message is in accordance with the $N_{AAC}$ saved during the last key negotiation process, if not, discards the unicast key negotiation request message, if so, go to step 322; if the current key negotiation process is not an updating process of a unicast key, go directly to step 322;

step 322, the REQ verifies whether the MIC3 field is correct, if not, discards the unicast key negotiation request message, if so, go to step 323;

step 323, the REQ generates a REQ challenge ($N_{REQ}$), calculates a unicast session key and $N_{AAC}$ used for the next key negotiation process and stores the unicast session key and the $N_{AAC}$, the unicast session key including a protocol data key (PDK) and a unicast data key (UDK);

the REQ calculates MIC4 using the PDK, forms a unicast key negotiation response message and sends it to the AAC;

the REQ installs the newly negotiated unicast session key, the unicast key negotiation response message including $N_{REQ}$, $N_{AAC}$ and MIC4, wherein, the $N_{REQ}$ field indicates an challenge of the REQ, which is a random number generated by the REQ;

the $N_{AAC}$ field indicates an challenge of the AAC, and has a value the same as the value of the $N_{AAC}$ field in the unicast key negotiation request message; if the unicast key negotiation process is performed for the first time, the value of the $N_{AAC}$ field is determined directly by the value of the $N_{AAC}$ field in the unicast key negotiation request message; if it is an updating process of the unicast key, the value of the $N_{AAC}$ field is the value of the $N_{AAC}$ field saved during the last unicast key negotiation process;

the MIC4 field indicates a message authentication code, which is a hash value of all the other fields except the MIC4 field in the unicast key negotiation response message calculated by the REQ using the generated PDK;

step 33, unicast key negotiation confirmation:

on receipt of the unicast key negotiation response message, the AAC performs the following:

step 331, if the current key negotiation process is an updating process of a unicast key, the AAC checks whether the $N_{AAC}$ field in the unicast key negotiation response message is in accordance with the $N_{AAC}$ saved during the last key negotiation process, if not, discards the unicast key negotiation response message, if so, go to step 332; f the current key negotiation process is not an updating process of a unicast key, the AAC checks whether the $N_{AAC}$ field value in the unicast key negotiation response message is in accordance with the $N_{AAC}$ field value in the unicast key negotiation request message; if not, discards the unicast key negotiation response message, if so, go to step 332;

step 332, the AAC calculates the unicast session key and the $N_{AAC}$ used for the next key negotiation according to the $N_{REQ}$ field and the $N_{AAC}$ field in the unicast key negotiation response message, stores them, the unicast session key including PDK and UDK;

step 333, the AAC verifies whether the MIC4 in the unicast key negotiation response message is correct using the PDK, if not, discards the unicast key negotiation response message, if not, go to step 334;

step 334, the AAC calculates MIC5 using the PDK, forms a unicast key negotiation confirmation message, and sends it to the REQ;

step 335, the AAC installs the newly negotiated unicast session key by the AAC, and activates sending and receiving functions of the newly installed unicast session key to allow encryption and decryption of unicast data based on the new key; if the current unicast key negotiation process is an updating process, the AAC further deletes the old unicast session key, the unicast key negotiation confirmation message including $N_{REQ}$ and MIC5, wherein, the $N_{REQ}$ field indicates challenge of the REQ, which is a random number generated by the REQ; the $N_{REQ}$ field has a value the same as the value of the $N_{REQ}$ field in the unicast key negotiation response message;

the MIC5 field indicates a message authentication code, which is a hash value of all the other fields except the MIC5 field in the unicast key negotiation confirmation message calculated by the AAC using the generated PDK;

step 34, on receipt of the unicast key negotiation confirmation message, the REQ performs the following:

step 341, the REQ checks whether the $N_{REQ}$ field is the same as the $N_{REQ}$ field in the unicast key negotiation response message sent by the REQ itself; if not, discards the unicast key negotiation confirmation message, if so, go to step 342;

step 342, the REQ verifies whether the MIC5 in the unicast key negotiation confirmation message is correct using the PDK; if not, discards the unicast key negotiation confirmation message, if so, go to step 343;

step 343, the REQ activates sending and receiving functions of the newly installed unicast session key to allow encryption and sending of unicast data based on the new key;

if the current unicast key negotiation process is an updating process, the REQ further deletes the old unicast session key.

The multicast key notification process in the key negotiation may include:

step 35, multicast key notification, the multicast key notification message including a key notification identifier KN, encrypted key data $E_{MDK}$ and MIC6;

wherein, the KN field indicates a key notification identifier, which is initialized as an integer and added by 1 for every key updating notification; if the notified key is unchanged, the KN field remains unchanged;

the $E_{MDK}$ field indicates encrypted key data, which is multicast data key (MDK) encrypted by the AAC using the PDK;

the MIC6 field indicates a message authentication code, which is a hash value of all the other fields except the MIC6 field in the multicast key notification message calculated by the AAC using the PDK generated during the unicast key negotiation;

step 36, multicast key responding:

on receipt of the multicast key notification message, the REQ performs the following:

step 361, the REQ checks whether the KN field is increased monotonically; if not, discards the multicast key notification message, if so, go to step 362;

step 362, the REQ verifies whether the MICE field is correct using the PDK generated during the unicast key negotiation; if not, discards the multicast key notification message, if so, go to step 363;

step 363, the REQ obtains the MDK by decrypting the $E_{MDK}$ field using the PDK generated during the unicast key negotiation;

step 364, the REQ stores the current value of the KN field, and generates a multicast key response message and sends it to the AAC, the multicast key response message including KN and MIC7;

wherein, the KN field indicates a key notification identifier, and has a value the same as the value of the KN field in the multicast key notification message;

the MIC7 field indicates a message authentication code, which is a hash value of all the other fields except the MIC7 field in the multicast key confirmation message calculated by the REQ using the PDK generated during the unicast key negotiation;

step 37, on receipt of the multicast key response message, the AAC performs the following:

step 371, the AAC compares whether the KN field is in accordance with the corresponding field in the multicast key notification message previously sent; if not, discards the multicast key response message, if so, go to step 372;

step 372, the AAC verifies whether the MIC7 field is correct using the PDK generated during the unicast key negotiation; if not, discards the multicast key response message, if so, obtains a multicast data key.

A security access control system for a wired local area network is also provided according to the present invention, characterized in that the security access control system for a wired local area network includes a requester (REQ), an authentication access controller (AAC) and an authentication server (AS), both the REQ and the AS are connected to the AAC, the AAC provides a service interface for the REQ, and the AS provides authentication service for the REQ and the AAC.

The present invention may bring the following advantages: the present invention provides a Tri-element Peer Authentication (TePA) based security access control method for accessing a wired Local Area Network (LAN), Tri-element LAN Access Control (TLAC), and a system thereof; direct identity authentication between the user and the network access control device can be realized; negotiation and dynamic update of the session key for link layer data protection can be achieved; a variety of network architectures such as an enterprise network and a telecommunication network are supported; good scalability and multiple authentication methods are supported; authentication protocols with different security levels are supported, meeting requirements of various users; and sub-modules of the protocol are independent and flexible, making it easy to select.

DETAILED DESCRIPTION OF THE INVENTION

As shown in FIGS. 1 to 4, it is according to the present invention provided a security access control method for a wired local area network, which includes a security policy negotiation process, an identity authentication process and a key negotiation process. Specifically, the security access control method may include the following steps.

Figure 1:
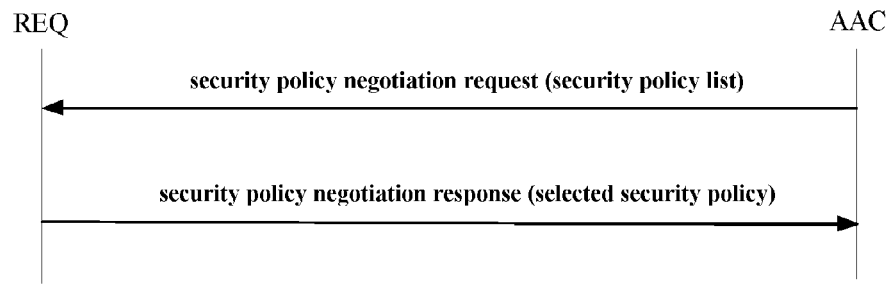
FIG. 1 is a schematic diagram of a security policy negotiation process according to the present invention.

1) As shown in FIG. 1, the security policy negotiation process may include the follow steps.

1.1) security policy negotiation requesting: when the REQ accesses the AAC, the AAC sends a security policy negotiation request message to the REQ.

The security policy negotiation request message includes mainly:

$$\boxed{TIE_{AAC}}$$

where the TIEAAC field indicates an information element of tri-element peer authentication (TePA) supported by the AAC, including an authentication and key management suite and a cryptography suite supported by the AAC;

1.2) security policy negotiation responding: on receipt of the security policy negotiation request message, the REQ performs the following:

selecting an authentication and key management suite and a cryptography suite that are commonly owned by the REQ and the AAC according to the authentication and key management suite and the cryptography suite supported by the AAC indicated by the $TIE_{AAC}$ field in the security policy negotiation request message in conjunction with a local policy, and forming a security policy negotiation response message and sending it to the AAC; discarding the security policy negotiation request message according to a local policy if the REQ does not support any of the authentication and key management suite and the cryptography suite supported by the AAC in the security policy negotiation request message.

The security policy negotiation response message includes mainly:

$$\boxed{TIE_{REQ}}$$

where the $TIE_{REQ}$ field indicates a TePA information element selected by the REQ, including the authentication and key management suite and the cryptography suite selected by the REQ.

1.3) on receipt of the security policy negotiation response message, the AAC performs the following:

1.3.1) determining whether the AAC supports the authentication and key management suite and the cryptography suite selected by the REQ; if not, discarding the security policy negotiation response message, and if so, go to 1.3.2);

1.3.2) starting a corresponding identity authentication process according to the authentication and key management suite selected by the REQ.

According to the present invention, it is provided a certificate-based authentication protocol TAEP-CAAP (Triple-element Authentication Extensible Protocol-Certificate-based 1 An Authentication Protocol).

Figure 2:
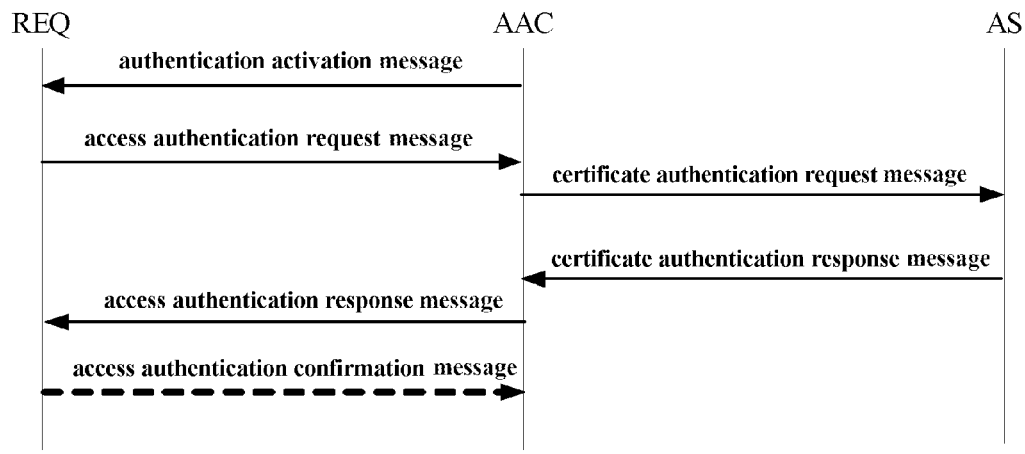
FIG. 2 is a schematic diagram of a core authentication process of TAEP-CAAP according to the present invention.
Figure 3:
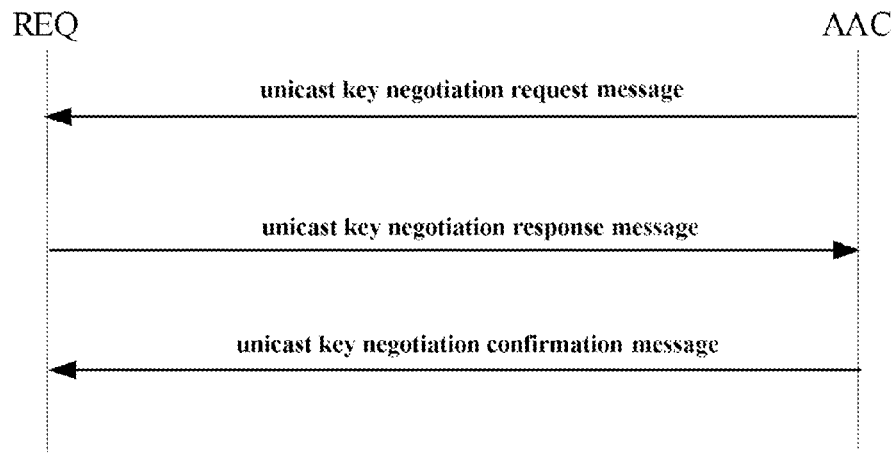
FIG. 3 is a schematic diagram of a unicast key negotiation process according to the present invention.

2) As shown in FIG. 2, the certificate-based authentication protocol TAEP-CAAP process may include:

2.1) authentication activation: if the authentication and key management suite negotiated by the REQ and the AAC is a certificate-based authentication and key management suite, the AAC sends an authentication activation message to the REQ to activate the REQ to perform certificate authentication, the authentication activation message including mainly:

| SNonce | $ID_{AS\text{-}AAC}$ | $Cert_{AAC}$ | $Para_{ECDH}$ | $TIE_{AAC}$ | $SIG_{AAC}$ | where the SNonce field indicates an authentication identifier, and is a random number generated by the AAC if the identify authentication process is performed for the first time; or an authentication identifier value generated from negotiation during the last identify authentication process if the current identify authentication process is an updating process;

the $ID_{AS-AAC}$ field indicates an identity ID of an authentication server (AS) trusted by the AAC, which is an ID of the AS who issued a certificate of the AAC ($Cert_{AAC}$);

the $Cert_{AAC}$ field indicates the certificate of the AAC;

the $Para_{ECDH}$ field indicates an elliptic curve cryptography parameter of an elliptic curve cryptography mechanism, which is an elliptic curve cryptography parameter used during calculation of Elliptic Curve Diffie-Hellman (ECDH) by the REQ and the AAC;

the $TIE_{AAC}$ field indicates an authentication and key management suite and a cryptography suite supported by the AAC, and has a value the same as the value of the $TIE_{AAC}$ field in the security policy negotiation request packe;

the $SIG_{AAC}$ field indicates a signature by the AAC, which is a signature signed by the AAC using a private key on all the other fields except the $SIG_{AAC}$ field in the authentication activation message; the $SIG_{AAC}$ field is an optional field.

2.2) access authentication request: on receipt of the authentication activation message, the REQ performs the following:

2.2.1) if the current identity authentication process is an updating process, the REQ checks whether the authentication identifier field value in the authentication activation message is in accordance with the authentication identifier saved during the last identity authentication process, if not, discards the authentication activation message, otherwise, go to 2.2.2); if the current identity authentication process is not an updating process but an identity authentication process for the first time, go to 2.2.2) directly;

2.2.2) the REQ verifies whether the $TIE_{AAC}$ field value is in accordance with the $TIE_{AAC}$ field value in the security policy negotiation request message received during the security policy negotiation; if not, discards the authentication activation message, if so, go to 2.2.3);

2.2.3) if the $SIG_{AAC}$ field is included in the received authentication activation message, the REQ verifies correctness of the $SIG_{AAC}$ field; if the $SIG_{AAC}$ field is incorrect, discards the received authentication activation message, if the $SIG_{AAC}$ field is correct, go to 2.2.4); if no $SIG_{AAC}$ field is included in the received authentication activation message, go directly to 2.2.4);

2.2.4) the REQ selects a certificate of the REQ issued by the AS ($Cert_{REQ}$) according to the $ID_{AS-AAC}$ field in the authentication activation message or selects a certificate of the REQ ($Cert_{REQ}$) according to a local policy; generates REQ key data x·P and a REQ challenge ($N_{REQ}$) for ECDH exchange; generates an access authentication request message and sends it to the AAC.

The access authentication request message includes mainly:

| SNonce | $N_{REQ}$ | x·P | $ID_{AAC}$ | $Cert_{REQ}$ | $Para_{ECDH}$ | $List_{AS-REQ}$ | $TIE_{REQ}$ | $Sig_{REQ}$ |
|---|---|---|---|---|---|---|---|---| where the SNonce field indicates an authentication identifier and has a value the same as the value of the SNonce field in the authentication activation message; if the identify authentication process is performed for the first time, the value of the SNonce field is determined directly by the value of the SNonce field in the authentication activation message; if the current identify authentication process is an updating process, the value of the SNonce field is the authentication identifier value calculated during the last identity authentication process;

the $N_{REQ}$ field indicates a REQ challenge, which is a random number generated by the REQ;

the x·P field indicates key data of the REQ, which is a temporary public key generated by the REQ for ECDH exchange;

the $ID_{AAC}$ field indicates an identity ID of the AAC, and is obtained according to the $Cert_{AAC}$ field in the authentication activation message;

the $Cert_{REQ}$ field indicates a certificate of the REQ;

the $Para_{ECDH}$ field indicates an ECDH parameter, which is an elliptic curve cryptography parameter used during ECDH calculation by the REQ and the AAC; and has a value the same as the value of the $Para_{ECDH}$ field in the authentication activation message;

the $List_{AS-REQ}$ field indicates a list of ASs trusted by the REQ, not including an issuer of the certificate of the REQ ($Cert_{REQ}$); the AAC is notified of by the REQ using the $List_{AS-REQ}$ field when the REQ trusts an entity other than the issuer of its certificate; the $List_{AS-REQ}$ field is an optional field;

the $TIE_{REQ}$ field indicates an authentication and key management suite and a cryptography suite selected by the REQ, and has a value the same as the value of the $TIE_{REQ}$ field in the security policy negotiation response message;

the $Sig_{REQ}$ field indicates a signature by the REQ, which is a signature signed by the REQ using a private key on all the other fields except the $Sig_{REQ}$ field in the access authentication request message;

2.3) certificate authentication requesting: on receipt of the access authentication request message, the AAC performs the following:

2.3.1) if the AAC has sent the authentication activation message, the AAC checks whether the SNonce field value and the $Para_{ECDH}$ field value in the received access authentication request message are in accordance with the corresponding field values in the authentication activation message, if any of the SNonce field value and the $Para_{ECDH}$ field value is not, discards the access authentication request message, otherwise, got to 2.3.2); if the AAC has not sent the authentication activation message, the AAC checks whether the SNonce field value is in accordance with the authentication identifier calculated during the last certificate authentication process and whether the $Para_{ECDH}$ field is in accordance with the $Para_{ECDH}$ field in the last authentication activation message, if any of the SNonce field value and the $Para_{ECDH}$ field is not, discards the access authentication request message, otherwise, go to 2.3.2);

2.3.2) the AAC checks whether the $ID_{AAC}$ is in accordance with the identity of the AAC itself and whether the $TIE_{REQ}$ field value is in accordance with the $TIE_{REQ}$ field value in the security policy negotiation response message received during the security policy negotiation; if any of the $ID_{AAC}$ and the $TIE_{REQ}$ field value is not, discards the access authentication request message; otherwise, go to 2.3.3);

2.3.3) the AAC verifies correctness of the $Sig_{REQ}$ field; if the $Sig_{REQ}$ field is incorrect, discards the access authentication request message; otherwise, go to 2.3.4);

2.3.4) if it is required according to a local policy of the AAC to use the AS to authenticate the certificate of the REQ ($Cert_{REQ}$), the AAC generates a certificate authentication request message and sends it to the AS; otherwise, go to 2.3.5);

2.3.5) the AAC authenticates the certificate of the REQ (Cert$_{REQ}$) locally, which includes validating a verification result of the certificate of the REQ (Cert$_{REQ}$) according to a verification result of the certificate of the REQ (Cert$_{REQ}$) cached locally and timeliness defined by a local policy; if the verification result of the Cert$_{REQ}$ is valid, generates locally key data and an AAC challenge (N$_{AAC}$) for ECDH exchange, the key data including a temporary public key y·P of the AAC, performs ECDH calculation according to the temporary public key x·P of the REQ and a temporary private key y of the AAC to obtain a base key (BK) and an authentication identifier for the next identity authentication process and store them, sets an access result to be successful, forms an access authentication response message and sends it to the REQ, and permits a user to access the network; if the verification result of the Cert$_{REQ}$ is invalid, the AAC sets the access result to be unsuccessful and the AAC challenge (N$_{AAC}$) and the key data y·P to be any values, forms an access authentication response message and sends it to the REQ, and removes association with the REQ.

The certificate authentication request message includes mainly:

| N$_{AAC}$ | N$_{REQ}$ | Cert$_{REQ}$ | Cert$_{AAC}$ | List$_{AS\text{-}REQ}$ |
|---|---|---|---|---| where the N$_{AAC}$ field indicates an AAC challenge, which is a random number generated by the AAC;

the N$_{REQ}$ field indicates REQ challenge, which is a random number generated by the REQ, and has a value the same as the value of the N$_{REQ}$ field in the access authentication request message sent by the REQ;

the Cert$_{REQ}$ field indicates a certificate of the REQ and has a value the same as the value of the Cert$_{REQ}$ field in the access authentication request packe;

the Cert$_{AAC}$ field indicates a certificate of the AAC and has a value the same as the value of the Cert$_{AAC}$ field in the authentication activation message;

the List$_{AS\text{-}REQ}$ field indicates a list of ASs trusted by the REQ and has a value the same as the value of the List$_{AS\text{-}REQ}$ field in the access authentication request message sent by the REQ; the List$_{AS\text{-}REQ}$ field is an optional field;

2.4) certificate authentication responding: on receipt of the certificate authentication request message, the AS performs the following:

2.4.1) in the case of unilateral authentication, the AS verifies the certificate of the REQ (Cert$_{REQ}$); in the case of mutual authentication, the AS verifies both the certificate of the AAC (Cert$_{AAC}$) and the certificate of the REQ (Cert$_{REQ}$), the verification of the certificates are performed with reference to RFC3280, and if the verification cannot be performed, the AS sets a verification result of a corresponding certificate to be issuer of the certificate undefined, otherwise, the AS verifies the certificate and performs 2.4.2);

2.4.2) the AS forms a certificate authentication response message according to the verification result of the certificate; adds a corresponding signature and sends the certificate authentication response message to the AAC.

The certificate authentication response message includes mainly:

| RES$_{Cert}$ | SIG$_{AS\text{-}REQ}$ | SIG$_{AS\text{-}AAC}$ |
|---|---|---| where the RES$_{Cert}$ field indicates the verification result of the certificate and includes an AAC challenge value (N$_{AAC}$), a REQ challenge value (N$_{REQ}$), the verification result of the Cert$_{AAC}$ and the verification result of the Cert$_{REQ}$; in case of unilateral verification, the RES$_{Cert}$ field does not include the verification result of the certificate of the AAC (Cert$_{AAC}$);

the SIG$_{AS\text{-}REQ}$ field indicates a signature signed by the AS trusted by the REQ on the verification result of the certificate (RES$_{Cert}$) in the certificate authentication response message;

the SIG$_{AS\text{-}AAC}$ field indicates a signature signed by the AS trusted by the AAC on all the other fields in the certificate authentication response message except the SIG$_{AS\text{-}AAC}$ field; the SIG$_{AS\text{-}AAC}$ field is an optional field, and is omitted if the AS who signed the verification result of the certificate is the same as the AS trusted by the AAC;

2.5) access authentication responding: on receipt of the certificate authentication response message, the AAC performs the following:

2.5.1) the AAC checks whether the AAC challenge (N$_{AAC}$) field value in the RES$_{Cert}$ field is the same as the N$_{AAC}$ field value in the certificate authentication request message; if not, discards the certificate authentication response message, if so, go to 2.5.2);

2.5.2) if two signature fields are included in the certificate authentication response message, the AAC checks whether the SIG$_{AS\text{-}AAC}$ field is correct, if not, discards the certificate authentication response message, if so, go to 2.5.3); if only one signature field is included in the certificate authentication response message, which indicates that the AS trusted by the REQ is also the AS trusted by the AAC, the AAC checks whether the SIG$_{AS\text{-}REQ}$ field is correct, if not, discards the certificate authentication response message, if so, go to 2.5.3);

2.5.3) the AAC checks whether the verification result of the Cert$_{REQ}$ in the RES$_{Cert}$ field is valid; if so, generates locally key data y·P and an AAC challenge (N$_{AAC}$) for ECDH exchange, performing ECDH calculation according to the temporary public key x·P of the REQ and a temporary private key y of the AAC to obtain a base key (BK) and an authentication identifier for the next identity authentication process and store them, sets an access result to be successful, forms an access authentication response message and sends it to the REQ, and permits a user to access the network; if the verification result of the Cert$_{REQ}$ is invalid, the AAC sets the access result to be unsuccessful, the AAC challenge (N$_{AAC}$) and the private data y·P to be any value, forms an access authentication response message and sends it to the REQ, and remove association with the REQ.

The access authentication response message includes mainly:

| N$_{REQ}$ | N$_{AAC}$ | Acc$_{RES}$ | x·P | y·P | ID$_{AAC}$ | ID$_{REQ}$ | MRES$_{Cert}$ | SIG$_{AAC}$/MIC1 |
|---|---|---|---|---|---|---|---|---| where the N$_{REQ}$ field indicates a REQ challenge, which is a random number generated by the REQ; the N$_{REQ}$ field is an optional field, it is included in the access authentication response message only in the case of unilateral authentication; and if the N$_{REQ}$ field exists, it has a value the same as the value of the N$_{REQ}$ field in the access authentication request message sent by the REQ;

the N$_{AAC}$ field indicates an AAC challenge, which is a random number generated by the AAC; the N$_{AAC}$ field is an optional field, it is included in the access authentication response message only in the case of unilateral authentication; and if the $N_{AAC}$ field exists, it has a value the value of the $N_{AAC}$ field in the access authentication request message sent by the AAC;

the $Acc_{RES}$ field indicates an access result, which is access success or access failure and a reason of the failure set by the AAC according to the authentication result;

the x·P field indicates key data of the REQ, which is a temporary public key generated by the REQ for ECDH exchange; the x·P field has a value the same as the value of the x·P field in the access authentication request message sent by the REQ;

the y·P field indicates key data of the AAC, which is a temporary public key generated by the AAC for ECDH exchange;

the $ID_{AAC}$ field indicates an identity ID of the AAC and is obtained according to the $Cert_{AAC}$ field;

the $ID_{REQ}$ field indicates an identity ID of the REQ and is obtained according to the $Cert_{REQ}$ field in the received access authentication request message;

the $MRES_{Cert}$ field indicates a combined certificate verification result; the $MRES_{Cert}$ field is an optional field, it is included in the access authentication response message only in the case of unilateral authentication; if the $MRES_{Cert}$ field exists, it includes the fields in the certificate authentication response message and the same values;

the $MRES_{Cert}$ field indicates a combined certificate verification result; the $MRES_{Cert}$ field is an optional field, it is included in the access authentication response message only in the case of unilateral authentication; if the $MRES_{Cert}$ field exists, it includes the fields in the certificate authentication response message and the same values;

the MIC1 field indicates a message authentication code, which is a hash value of all the other fields except the MIC1 field in the access authentication response message and an authentication identifier for the next certificate authentication process calculated by the AAC using the BK generated from negotiation during the authentication;

the access authentication response message includes one or more of the $SIG_{AAC}$ field and the MIC1 field; if the authentication activation message exists in the current identity authentication process and if the access authentication activation message includes the $SIG_{AAC}$ field, the authentication response message includes only the MIC1 field; if no authentication activation message exists in the current identity authentication or if the authentication activation message does not include a $SIG_{AAC}$ field, the access authentication response message includes only the $SIG_{AAC}$ field;

2.6) access authentication confirmation: on receipt of the access authentication response message, the REQ performs the following:

2.6.1) the REQ determines whether the received access authentication response message corresponds to the current access authentication request message according to the $ID_{AAC}$ field and the $ID_{REQ}$ field in the access authentication response message; if not, discards the received access authentication response message; if so, go to 2.6.2);

2.6.2) the REQ determines whether the REQ key data field x·P value in the access authentication response message is in accordance with the x·P field value in the access authentication request message sent by the REQ itself; if not, discards the access authentication response message, otherwise, go to 2.6.3);

2.6.3) in the case of unilateral authentication, the REQ determines whether the $N_{REQ}$ field value is in accordance with the $N_{REQ}$ field value in the access authentication request message sent previously; if not, discards the access authentication response message, otherwise, go to 2.6.4); in the case of mutual authentication, go directly to 2.6.4);

2.6.4) the REQ checks the $Acc_{RES}$ field in the access authentication response message; if the access result is unsuccessful, removes association with the AAC, otherwise, go to 2.6.5);

2.6.5) if the received access authentication response message includes the $SIG_{AAC}$ field, the REQ verifies correctness of the $SIG_{AAC}$ field, if the $SIG_{AAC}$ is incorrect, discards the access authentication response message, otherwise, go to 2.6.6); if the received access authentication response message includes the MIC1 field, the REQ verifies correctness of the MIC1 field, if the MIC1 field is incorrect, discards the access authentication response message, otherwise, go to 2.6.6);

2.6.6) in the case of unilateral authentication, go to 2.6.8); otherwise, the REQ verifies whether the $N_{REQ}$ field value included in the $MRES_{Cert}$ field is in accordance with the $N_{REQ}$ field value in the access authentication request message sent by the REQ itself, if not, discards the access authentication response message, if so, verifies whether the $SIG_{AS-REQ}$ is correct, if not, discards the access authentication response message, if so, go to 2.6.7);

2.6.7) the REQ verifies whether the AAC certificate verification result in the $MRES_{Cert}$ field is valid; if not, it is determined that the network is invalid and should not be accessed, otherwise, it is determined that the network is valid and can be accessed, and go to 2.6.8);

2.6.8) the REQ performs ECDH calculation according to the temporary public key y·P of the AAC and the temporary private key x of the REQ to obtain a BK and an authentication identifier for the next certificate authentication process, and stores the BK and the authentication identifier;

2.6.9) if the received access authentication response message includes the $SIG_{AAC}$ field, sending an access authentication confirmation message is optional; if the received access authentication response message includes the MIC1 field, the REQ forms an access authentication confirmation message and sends it to the AAC.

The access authentication confirmation message includes mainly:

$$\boxed{MIC2}$$

where the MIC2 field indicates a message authentication code, which is a hash value of the AAC challenge value ($N_{AAC}$), the REQ challenge value ($N_{REQ}$) and an authentication identifier for the next certificate authentication process calculated by the REQ using the BK generated from negotiation during the authentication.

If the $SIG_{AAC}$ field is included in the access authentication response message sent by the AAC, the AAC may wait to receive the access authentication confirmation message after sending the access authentication response message to the REQ.

on receipt of the access authentication confirmation message sent by the REQ, the AAC may verify correctness of the MIC2 field in the access authentication confirmation message, if the MIC2 field is correct, then the REQ has a BK in accordance with the AAC; if the MIC2 field is incorrect, the AAC discards the access authentication response message.

This protocol is highly integrated, can realize both mutual authentication and unilateral authentication, and supports authentication updating and simplified authentication updating. The simplified authentication updating refers to the AAC and the REQ directly performing signature verification without the AS verifying the certificate. That is, with respect of the content of the message, no complex certificate verification result field is included in the access authentication response message. The simplified authentication process can only be used as an authentication updating process but should not be used for authentication for the client connecting to the network for the first time.

3) As shown in Figure, a unicast key negotiation process ay include:

3.1) unicast key negotiation requesting: after the AAC and the REQ complete the identity authentication processes, the AAC sends a unicast key negotiation request message to the REQ to start a unicast key negotiation process with the REQ, the unicast key negotiation request message including mainly:

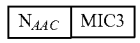

where the $N_{AAC}$ field indicates an challenge of the AAC, which is a random number generated by the AAC if the unicast key negotiation process is performed for the first time; or has a value the same as the $N_{AAC}$ field saved during the last unicast key negotiation process if the current unicast key is an updating process of a unicast key;

the MIC3 field indicates a message authentication code, which is a hash value calculated by the AAC by using a BK commonly owned by the AAC and the REQ;

3.2) unicast key negotiation responding:

on receipt of the unicast key negotiation request message, the REQ performs the following:

3.2.1) if the current key negotiation process is an updating process of a unicast key, the REQ checks whether the $N_{AAC}$ field in the unicast key negotiation request message is in accordance with the $N_{AAC}$ saved during the last key negotiation process, if not, discards the unicast key negotiation request message, if so, go to 3.2.2); if the current key negotiation process is not an updating process of a unicast key, go directly to 3.2.2);

3.2.2) the REQ verifies whether the MIC3 field is correct, if not, discards the unicast key negotiation request message, if so, go to 3.2.3);

3.2.3) the REQ generates a REQ challenge ($N_{REQ}$), calculates a unicast session key and $N_{AAC}$ used for the next key negotiation process and stores the unicast session key and the $N_{AAC}$, the unicast session key including a protocol data key (PDK) and a unicast data key (UDK);

the REQ calculates MIC4 using the PDK, forms a unicast key negotiation response message and sends it to the AAC;

the REQ installs the newly negotiated unicast session key, the unicast key negotiation response message includes mainly:

where the $N_{REQ}$ field indicates an challenge of the REQ, which is a random number generated by the REQ;

the $N_{AAC}$ field indicates an challenge of the AAC, and has a value the same as the value of the $N_{AAC}$ field in the unicast key negotiation request message; if the unicast key negotiation process is performed for the first time, the value of the $N_{AAC}$ field is determined directly by the value of the $N_{AAC}$ field in the unicast key negotiation request message; if it is an updating process of the unicast key, the value of the $N_{AAC}$ field is the value of the $N_{AAC}$ field saved during the last unicast key negotiation process;

the MIC4 field indicates a message authentication code, which is a hash value of all the other fields except the MIC4 field in the unicast key negotiation response message calculated by the REQ using the generated PDK.

Figure 4:
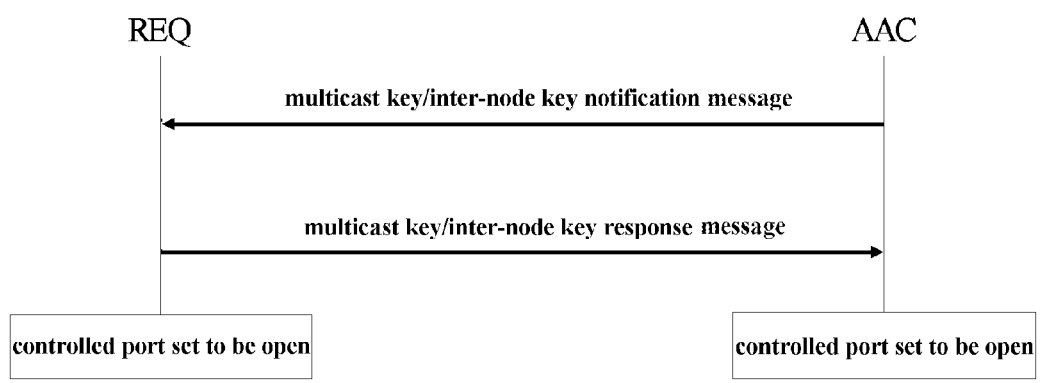
FIG. 4 is a schematic diagram of a multicast key notification process according to the present invention.

3.3) unicast key negotiation confirmation: on receipt of the unicast key negotiation response message, the AAC performs the following:

3.3.1) if the current key negotiation process is an updating process of a unicast key, the AAC checks whether the $N_{AAC}$ field in the unicast key negotiation response message is in accordance with the $N_{AAC}$ saved during the last key negotiation process, if not, discards the unicast key negotiation response message, if so, go to 3.3.2); f the current key negotiation process is not an updating process of a unicast key, the AAC checks whether the $N_{AAC}$ field value in the unicast key negotiation response message is in accordance with the $N_{AAC}$ field value in the unicast key negotiation request message; if not, discards the unicast key negotiation response message, if so, go to 3.3.2);

3.3.2) the AAC calculates the unicast session key and the $N_{AAC}$ used for the next key negotiation according to the $N_{REQ}$ field and the $N_{AAC}$ field in the unicast key negotiation response message, stores them, the unicast session key including PDK and UDK;

3.3.3) the AAC verifies whether the MIC4 in the unicast key negotiation response message is correct using the PDK, if not, discards the unicast key negotiation response message, if not, go to 3.3.4);

3.3.4) the AAC calculates MIC5 using the PDK, forms a unicast key negotiation confirmation message, and sends it to the REQ;

3.3.5) the AAC installs the newly negotiated unicast session key by the AAC, and activates sending and receiving functions of the newly installed unicast session key to allow encryption and decryption of unicast data based on the new key; if the current unicast key negotiation process is an updating process, the AAC further deletes the old unicast session key, the unicast key negotiation confirmation message includes mainly:

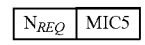

where the $N_{REQ}$ field indicates challenge of the REQ, which is a random number generated by the REQ; the $N_{REQ}$ field has a value the same as the value of the $N_{REQ}$ field in the unicast key negotiation response message;

the MIC5 field indicates a message authentication code, which is a hash value of all the other fields except the MIC5 field in the unicast key negotiation confirmation message calculated by the AAC using the generated PDK;

3.4) on receipt of the unicast key negotiation confirmation message, the REQ performs the following:

3.4.1) the REQ checks whether the $N_{REQ}$ field is the same as the $N_{REQ}$ field in the unicast key negotiation response message sent by the REQ itself; if not, discards the unicast key negotiation confirmation message, if so, go to 3.4.2);

3.4.2) the REQ verifies whether the MIC5 in the unicast key negotiation confirmation message is correct using the PDK; if not, discards the unicast key negotiation confirmation message, if so, go to 3.4.3);

3.4.3) the REQ activates sending and receiving functions of the newly installed unicast session key to allow encryption and sending of unicast data based on the new key; if the current unicast key negotiation process is an updating process, the REQ further deletes the old unicast session key;

4) As shown in FIG. 4, the multicast key notification process may include:

4.1) Multicast key notification, the multicast key notification message includes mainly:

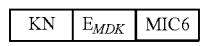

where the KN field indicates a key notification identifier, which is initialized as an integer and added by 1 for every key updating notification; if the notified key is unchanged, the KN field remains unchanged;

the $E_{MDK}$ field indicates encrypted key data, which is multicast data key (MDK) encrypted by the AAC using the PDK;

the MIC6 field indicates a message authentication code, which is a hash value of all the other fields except the MIC6 field in the multicast key notification message calculated by the AAC using the PDK generated during the unicast key negotiation;

4.2) multicast key responding:

on receipt of the multicast key notification message, the REQ performs the following:

4.2.1) the REQ checks whether the KN field is increased monotonically; if not, discards the multicast key notification message, if so, go to 4.2.2);

4.2.2) the REQ verifies whether the MIC6 field is correct using the PDK generated during the unicast key negotiation; if not, discards the multicast key notification message, if so, go to step 4.2.3);

4.2.3) the REQ obtains the MDK by decrypting the $E_{MDK}$ field using the PDK generated during the unicast key negotiation;

4.2.4) the REQ stores the current value of the KN field, and generates a multicast key response message and sends it to the AAC, the multicast key response message includes mainly:

where the KN field indicates a key notification identifier, and has a value the same as the value of the KN field in the multicast key notification message t;

the MIC7 field indicates a message authentication code, which is a hash value of all the other fields except the MIC7 field in the multicast key confirmation message calculated by the REQ using the PDK generated during the unicast key negotiation;

4.3) on receipt of the multicast key response message, the AAC performs the following:

4.3.1) the AAC compares whether the KN field is in accordance with the corresponding field in the multicast key notification message previously sent; if not, discards the multicast key response message, if so, go to 4.3.2);

4.3.2) the AAC verifies whether the MIC7 field is correct using the PDK generated during the unicast key negotiation; if not, discards the multicast key response message, if so, obtains a multicast data key;

When the AAC completes multicast key notification to the REQ successfully, secret communication of data between the AAC and the REQ will be conducted using the above unicast data key and multicast data key that have been negotiated or notified.

In addition to the security access control method for a wired local area network, the present invention also provides a security access control system for a wired local area network, and the system includes: a requester (REQ), an Authentication Access Controller (AAC) and an Authentication Server (AS). Both the REQ and the AS are connected to the AAC, the AAC provides a service interface for the REQ, and the AS provides authentication service for the REQ and the AAC.

It is noted that the above embodiments are for illustrative purposes only, which shall not be considered as limiting the scope of the invention. The present invention is described in detail with reference to the above embodiments, however, those skilled in the art shall understand that modifications and equivalents may made to the technical solutions or some technical features of the above embodiments, without deviation from the scope of the the present invention.

The invention claimed is:

1. A security access control method for a wired local area network, wherein the method comprises:

step 1, performing, by a requester (REQ) and an authentication access controller (AAC), security policy negotiation between the REQ and the AAC, wherein the AAC comprises a transmitter for transmitting messages and a receiver for receiving messages;

step 2, performing, by the REQ and the AAC, identity authentication between the REQ and the AAC; and step 3, performing, by the REQ and the AAC, key negotiation between the REQ and the AAC, wherein step 1 comprises:

step 1.1, security policy negotiation requesting:

when the REQ accesses the AAC, the AAC sends a security policy negotiation request message to the REQ, the security policy negotiation request message comprising $TIE_{AAC}$ wherein, the $TIE_{AAC}$ field indicates an information element of tri-element peer authentication (TePA) supported by the AAC, comprising an authentication and key management suite and a cryptography suite supported by the AAC;

step 1.2, security policy negotiation responding:

on receipt of the security policy negotiation request message, the REQ performs the following:

selecting an authentication and key management suite and a cryptography suite that are commonly owned by the REQ and the AAC according to the authentication and key management suite and the cryptography suite supported by the AAC indicated by the $TIE_{AAC}$ field in the security policy negotiation request message in conjunction with a local policy, and forming a security policy negotiation response message and sending it to the AAC; discarding the security policy negotiation request message according to a local policy if the REQ does not support any of the authentication and key management suite and the cryptography suite supported by the AAC in the security policy negotiation request message, the security policy negotiation response message comprising $TIE_{REQ}$ wherein, the $TIE_{REQ}$ field indicates a TePA information element selected by the REQ, comprising the authentication and key management suite and the cryptography suite selected by the REQ;

step 1.3, on receipt of the security policy negotiation response message, the AAC performs the following:

step 1.3.1, determining whether the AAC supports the authentication and key management suite and the cryptography suite selected by the REQ; if not, discarding the security policy negotiation response message, and if so, go to step 1.3.2;

step 1.3.2, starting a corresponding identity authentication process according to the authentication and key management suite selected by the REQ;

wherein in step 1.3.1, the authentication and key management suite selected by the REQ is a certificate-based authentication protocol Triple-element Authentication Extensible Protocol Certificate-based 1 An Authentication Protocol (TAEP-CAAP);

wherein when the authentication and key management suite selected by the REQ is TAEP-CAAP, step 2 comprises:

step 2.1, authentication activation:

the AAC sends an authentication activation message to the REQ to activate the REQ to perform certificate authentication, the authentication activation message comprising SNonce, $ID_{AS-AAC}$, $Cert_{AAC}$, $Para_{ECDH}$, $TIE_{AAC}$ and $SIG_{AAC}$;

wherein, the SNonce field indicates an authentication identifier, and is a random number generated by the AAC if the identity authentication process is performed for the first time; or an authentication identifier value generated from negotiation during the last identity authentication process if the current identity authentication process is an updating process;

the $ID_{AS-AAC}$ field indicates an identity ID of an authentication server (AS) trusted by the AAC, which is an ID of the AS who issued a certificate of the AAC ($Cert_{AAC}$);

the $Cert_{AAC}$ field indicates the certificate of the AAC;

the $Para_{ECDH}$ field indicates an elliptic curve cryptography parameter of an elliptic curve cryptography mechanism, which is an elliptic curve cryptography parameter used during calculation of Elliptic Curve Diffie-Hellman (ECDH) by the REQ and the AAC;

the $TIE_{AAC}$ field indicates an authentication and key management suite and a cryptography suite supported by the AAC, and has a value the same as the value of the $TIE_{AAC}$ field in the security policy negotiation request message;

the $SIG_{AAC}$ field indicates a signature by the AAC, which is a signature signed by the AAC using a private key on all the other fields except the $SIG_{AAC}$ field in the authentication activation message; the $SIG_{AAC}$ field is an optional field;

step 2.2, access authentication request:

on receipt of the authentication activation message, the REQ performs the following:

step 2.2.1, if the current identity authentication process is an updating process, the REQ checks whether the authentication identifier value in the authentication activation message is in accordance with the authentication identifier saved during the last identity authentication process, if not, discards the authentication activation message, otherwise, go to step 2.2.2; if the current identity authentication process is not an updating process but an identity authentication process for the first time, go to step 2.2.2 directly;

step 2.2.2, the REQ verifies whether the $TIE_{AAC}$ field value is in accordance with the $TIE_{AAC}$ field value in the security policy negotiation request message received during the security policy negotiation; if not, discards the authentication activation message, if so, go to step 2.2.3;

step 2.2.3, if the $SIG_{AAC}$ field is comprised in the received authentication activation message, the REQ verifies correctness of the $SIG_{AAC}$ field; if the $SIG_{AAC}$ field is incorrect, discards the received authentication activation message, if the $SIG_{AAC}$ field is correct, go to step 2.2.4; if no $SIG_{AAC}$ field is comprised in the received authentication activation message, go directly to step 2.2.4;

step 2.2.4, the REQ selects a certificate of the REQ issued by the AS ($Cert_{REQ}$). according to the $ID_{AS-AAC}$ field in the authentication activation message or selects a certificate of the REQ ($Cert_{REQ}$) according to a local policy; generates REQ key data x·P and a REQ challenge (NREQ) for ECDH exchange; generates an access authentication request message and sends it to the AAC, the access authentication request message comprising SNonce, $N_{REQ}$, x·P, $ID_{AAC}$, $Cert_{REQ}$, $Para_{ECDH}$, $LIST_{AS\_REQ}$, $TIE_{REQ}$ and $Sig_{REQ}$;

wherein, the SNonce field indicates an authentication identifier and has a value the same as the value of the SNonce field in the authentication activation message; if the identity authentication process is performed for the first time, the value of the SNonce field is determined directly by the value of the SNonce field in the authentication activation message; if the current identity authentication process is an updating process, the value of the SNonce field is the authentication identifier value calculated during the last identity authentication process;

the NREQ field indicates a REQ challenge, which is a random number generated by the REQ;

the x·P field indicates key data of the REQ, which is a temporary public key generated by the REQ for ECDH exchange;

the $ID_{AAC}$ field indicates an identity ID of the AAC, and is obtained according to the $Cert_{AAC}$ field in the authentication activation message;

the $Cert_{REQ}$ field indicates a certificate of the REQ;

the $Para_{ECDH}$ field indicates an ECDH parameter, which is an elliptic curve cryptography parameter used during ECDH calculation by the REQ and the AAC; and has a value the same as the value of the Para.ECDH field in the authentication activation message;

the $List_{AS-REQ}$ field indicates a list of ASs trusted by the REQ, not comprising an issuer of the certificate of the REQ ($Cert_{REQ}$); the AAC is notified of by the REQ using the $List_{AS-REQ}$ field when the REQ trusts an entity other than the issuer of its certificate; the $List_{AS-REQ}$ field is an optional field;

the $TIE_{REQ}$ field indicates an authentication and key management suite and a cryptography suite selected by the REQ, and has a value the same as the value of the $TIE_{REQ}$ field in the security policy negotiation response message;

the $Sig_{REQ}$ field indicates a signature by the REQ, which is a signature signed by the REQ using a private key on all the other fields except the $Sig_{REQ}$, field in the access authentication request message.

2. The security access control method for a wired local area network according to claim 1, wherein the key negotiation comprises:

unicast key negotiation; or unicast key negotiation and multicast key notification.

3. The security access control method for a wired local area network according to claim 1, wherein when the authentication and key management suite selected by the REQ is TAEP-CAAP, step 2 further comprises:

step 2.3, certificate authentication requesting:

on receipt of the access authentication request message, the AAC performs the following:

step 2.3.1, if the AAC has sent the authentication activation message, the AAC checks whether the SNonce field value and the $Para_{ECDH}$ field value in the received access authentication request message are in accordance with the corresponding field values in the authentication activation message, if any of the SNonce field value and the $Para_{ECDH}$ field value is not, discards the access authentication request message, otherwise, got to step 2.3.2; if the AAC has not sent the authentication activation message, the AAC checks whether the SNonce field value is in accordance with the authentication identifier calculated during the last certificate authentication process and whether the $Para_{ECDH}$ field is in accordance with the $Para_{ECDH}$ field in the last authentication activation message, if any of the SNonce field value and the $Para_{ECDH}$ field is not, discards the access authentication request message, otherwise, go to step 2.3.2;

step 2.3.2, the AAC checks whether the $ID_{AAC}$ is in accordance with the identity of the AAC itself and whether the $TIE_{REQ}$ field value is in accordance with the $TIE_{REQ}$ field value in the security policy negotiation response message received during the security policy negotiation; if any of the $ID_{AAC}$ and the $TIE_{REQ}$ field value is not, discards the access authentication request message; otherwise, go to step 2.3.3;

step 2.3.3, the AAC verifies correctness of the $Sig_{REQ}$ field; if the $Sig_{REQ}$ field is incorrect, discards the access authentication request message; otherwise, go to step 2.3.4;

step 2.3.4, if it is required according to a local policy of the AAC to use the AS to authenticate the certificate of the REQ ($Cert_{REQ}$), the AAC generates a certificate authentication request message and sends it to the AS; otherwise, go to step 2.3.5;

step 2.3.5, the AAC authenticates the certificate of the REQ ($Cert_{REQ}$) locally, which comprises validating a verification result of the certificate of the REQ ($Cert_{REQ}$) according to a verification result of the certificate of the REQ ($Cert_{REQ}$) cached locally and timeliness defined by a local policy; if the verification result of the $Cert_{REQ}$ is valid, locally generates key data and an AAC challenge ($N_{AAC}$) for ECDH exchange, the key data comprising a temporary public key y·P of the AAC, performs ECDH calculation according to the temporary public key x·P of the REQ and a temporary private key y of the AAC to obtain a base key (BK) and an authentication identifier for the next identity authentication process and store them, sets an access result to be successful, forms an access authentication response message and sends it to the REQ, and permits a user to access the network; if the verification result of the $Cert_{REQ}$ is invalid, the AAC sets the access result to be unsuccessful and the AAC challenge ($N_{AAC}$) and the key data y·P to be any values, forms an access authentication response message and sends it to the REQ, and removes association with the REQ, the certificate authentication request message comprises: $N_{AAC}$, $N_{REQ}$, $Cert_{REQ}$, $Cert_{AAC}$ and $List_{AS-REQ}$;

wherein, the $N_{AAC}$ field indicates an AAC challenge, which is a random number generated by the AAC;

the $N_{REQ}$ field indicates REQ challenge, which is a random number generated by the REQ, and has a value the same as the value of the NREQ field in the access authentication request message sent by the REQ;

the $Cert_{REQ}$ field indicates a certificate of the REQ and has a value the same as the value of the $Cert_{REQ}$ field in the access authentication request message;

the $Cert_{AAC}$ field indicates a certificate of the AAC and has a value the same as the value of the $Cert_{AAC}$ field in the authentication activation message;

the $List_{AS-REQ}$ field indicates a list of ASs trusted by the REQ and has a value the same as the value of the $List_{AS-REQ}$ field in the access authentication request message sent by the REQ; the $List_{AS-REQ}$ field is an optional field;

step 2.4, certificate authentication responding:

on receipt of the certificate authentication request message, the AS performs the following:

step 2.4.1, in the case of unilateral authentication, the AS verifies the certificate of the REQ ($Cert_{REQ}$); in the case of mutual authentication, the AS verifies both the certificate of the AAC ($Cert_{AAC}$) and the certificate of the REQ ($Cert_{REQ}$), the verification of the certificates are performed with reference to RFC3280, and if the verification cannot be performed, the AS sets a verification result of a corresponding certificate to be issuer of the certificate undefined, otherwise, the AS verifies the certificate and performs step 2.4.2;

step 2.4.2, the AS forms a certificate authentication response message according to the verification result of the certificate; adds a corresponding signature and sends the certificate authentication response message to the AAC, the certificate authentication response message comprising REScert, $SIG_{AS-REQ}$ and $SIG_{AS-AAC}$, wherein the $RES_{cert}$ field indicates the verification result of the certificate and comprises an AAC challenge value (NAAc), a REQ challenge value ($N_{REQ}$), the verification result of the $Cert_{AAC}$ and the verification result of the $Cert_{REQ}$; in case of unilateral verification, the REScert field does not comprise the verification result of the certificate of the AAC ($Cert_{AAC}$);

the $SIG_{AS-REQ}$ field indicates a signature signed by the AS trusted by the REQ on the verification result of the certificate (REScert) in the certificate authentication response message;

the $SIG_{AS-AAC}$ field indicates a signature signed by the AS trusted by the AAC on all the other fields in the certificate authentication response message except the $SIG_{As-ARC}$ field;

the $SIG_{AS-AAC}$ field is an optional field, and is omitted if the AS who signed the verification result of the certificate is the same as the AS trusted by the AAC;

step 2.5. access authentication responding:

on receipt of the certificate authentication response message, the AAC performs the following:

step 2.5.1, the AAC checks whether the AAC challenge ($N_{AAC}$) field value in the $RES_{cert}$ field is the same as the $N_{AAC}$ field value in the certificate authentication request message; if not, discards the certificate authentication response message, if so, go to step 2.5.2;

step 2.5.2, if two signature fields are comprised in the certificate authentication response message, the AAC checks whether the $SIG_{AS-AAC}$ field is correct, if not, discards the certificate authentication response message, if so, go to step 2.5.3; if only one signature field is comprised in the certificate authentication response message, which indicates that the AS trusted by the REQ is also the AS trusted by the AAC, the AAC checks whether the $SIG_{AS-REQ}$ field is correct, if not, discards the certificate authentication response message, if so, go to step 2.5.3;

step 2.5.3, the AAC checks whether the verification result of the $Cert_{REQ}$ in the $RES_{cert}$ field is valid; if so, locally generates key data y·P and an AAC challenge ($N_{AAC}$) for ECDH exchange, performing ECDH calculation according to the temporary public key x·P of the REQ and a temporary private key y of the AAC to obtain a base key (BK) and an authentication identifier for the next identity authentication process and store them, sets an access result to be successful, forms an access authentication response message and sends it to the REQ, and permits a user to access the network; if the verification result of the $Cert_{REQ}$ is invalid, the AAC sets the access result to be unsuccessful, the AAC challenge ($N_{AAC}$) and the private data y·P to be any value, forms an access authentication response message and sends it to the REQ, and remove association with the REQ, the access authentication response message comprising $N_{REQ}$, $N_{AAC}$, $Acc_{RES}$, x·P, y·P, $ID_{AAC}$, $ID_{REQ}$, $MRES_{cert}$ and $SIG_{AAC}$ or MIC1, wherein, the $N_{REQ}$ field indicates a REQ challenge, which is a random number generated by the REQ; the $N_{REQ}$ field is an optional field, it is comprised in the access authentication response message only in the case of unilateral authentication; and if the $N_{REQ}$ field exists, it has a value the same as the value of the $N_{REQ}$ field in the access authentication request message sent by the REQ;

the $N_{AAC}$ field indicates an AAC challenge, which is a random number generated by the AAC; the $N_{AAC}$ field is an optional field, it is comprised in the access authentication response message only in the case of unilateral authentication; and if the $N_{AAC}$ field exists, it has a value the value of the $N_{AAC}$ field in the access authentication request message sent by the AAC;

the $Acc_{RES}$ field indicates an access result, which is access success or access failure and a reason of the failure set by the AAC according to the authentication result;

the x·P field indicates key data of the REQ, which is a temporary public key generated by the REQ for ECDH exchange; the x·P field has a value the same as the value of the x·P field in the access authentication request message sent by the REQ;

the y·P field indicates key data of the AAC, which is a temporary public key generated by the AAC for ECDH exchange;

the $ID_{AAC}$ field indicates an identity ID of the AAC and is obtained according to the $Cert_{AAC}$ field;

the $ID_{REQ}$ field indicates an identity ID of the REQ and is obtained according to the $Cert_{REQ}$ field in the received access authentication request message;

the $MRES_{cert}$ field indicates a combined certificate verification result; the $MRES_{cert}$ field is an optional field, it is comprised in the access authentication response message only in the case of unilateral authentication; if the $MRES_{cert}$ field exists, it comprises the fields in the certificate authentication response message and the same values;

the $SIG_{AAC}$ field indicates a signature of the AAC, which is a signature signed by the AAC using a private key of the AAC on all the other fields except the $SIG_{AAC}$ field in the access authentication response message;

the MICI field indicates a message authentication code, which is a hash value of all the other fields except the MICI field in the access authentication response message and an authentication identifier for the next certificate authentication process calculated by the AAC using the BK generated from negotiation during the authentication;

the access authentication response message comprises one or more of the $SIG_{AAC}$ field and the MICI field; if the authentication activation message exists in the current identity authentication process and if the access authentication activation message comprises the $SIG_{AAC}$ field, the authentication response message comprises only the MICI field; if no authentication activation message exists in the current identity authentication or if the authentication activation message does not comprise a $SIG_{AAC}$ field, the access authentication response message comprises only the $SIG_{AAC}$ field;

step 2.6, access authentication confirmation:

on receipt of the access authentication response message, the REQ performs the following:

step 2.6.1, the REQ determines whether the received access authentication response message corresponds to the current access authentication request message according to the $ID_{AAC}$ field and the $ID_{REQ}$ field in the access authentication response message; if not, discards the received access authentication response message; if so, go to step 2.6.2;

step 2.6.2, the REQ determines whether the REQ key data field x·P value in the access authentication response message is in accordance with the x·P field value in the access authentication request message sent by the REQ itself; if not, discards the access authentication response message, otherwise, go to step 2.6.3;

step 2.6.3, in the case of unilateral authentication, the REQ determines whether the $N_{REQ}$ field value is in accordance with the $N_{REQ}$ field value in the access authentication request message sent previously; if not, discards the access authentication response message, otherwise, go to step 2.6.4; in the case of mutual authentication, go directly to step 2.6.4;

step 2.6.4, the REQ checks the $ACC_{RES}$ field in the access authentication response message; if the access result is unsuccessful, removes association with the AAC, otherwise, go to step 2.6.5;

step 2.6.5, if the received access authentication response message comprises the $SIG_{AAC}$ field, the REQ verifies correctness of the $SIG_{AAC}$ field, if the $SIG_{AAC}$ is incorrect, discards the access authentication response message, otherwise, go to step 2.6.6;

if the received access authentication response message comprises the MICI field, the REQ verifies correctness of the MICI field, if the MICI field is incorrect, discards the access authentication response message, otherwise, go to step 2.6.6;

step 2.6.6, in the case of unilateral authentication, go to step 2.6.8; otherwise, the REQ verifies whether the $N_{REQ}$ field value comprised in the $MRES_{cert}$ field is in accordance with the $N_{REQ}$ field value in the access authentication request message sent by the REQ itself, if not, discards the access authentication response message, if so, verifies whether the $SIG_{AS\text{-}REQ}$ is correct, if not, discards the access authentication response message, if so, go to step 2.6.7;

step 2.6.7, the REQ verifies whether the AAC certificate verification result in the $MRES_{cert}$ field is valid; if not, it is determined that the network is invalid and should not be accessed, otherwise, it is determined that the network is valid and can be accessed, and go to step 2.6.8;

step 2.6.8, the REQ performs ECDH calculation according to the temporary public key y·P of the AAC and the temporary private key x of the REQ to obtain a BK and an authentication identifier for the next certificate authentication process, and stores the BK and the authentication identifier;

step 2.6.9, if the received access authentication response message comprises the $SIG_{AAC}$ field, sending an access authentication confirmation message is optional; if the received access authentication response message comprises the MIC1 field, the REQ forms an access authentication confirmation message and sends it to the AAC, the access authentication confirmation message comprising MIC2, wherein, the MIC2 field indicates a message authentication code, which is a hash value of the AAC challenge value ($N_{AAC}$), the REQ challenge value ($N_{REQ}$) and an authentication identifier for the next certificate authentication process calculated by the REQ using the BK generated from negotiation during the authentication.

4. The security access control method for a wired local area network according to claim 3, wherein in step 2.5.3, if the SIGAAc field is comprised in the access authentication response message sent by the AAC, the AAC waits to receive the access authentication confirmation message after sending the access authentication response message to the REO.

5. The security access control method for a wired local area network according to claim 3, wherein in step 2.6.9, on receipt of the access authentication confirmation message sent by the REO, the AAC verifies correctness of the MIC2 field in the access authentication confirmation message, if the MIC2 field is correct, then the REO has a BK in accordance with the AAC; if the MIC2 field is incorrect, the AAC discards the access authentication response message.

6. The security access control method for a wired local area network according to claim 3, wherein step 3 comprises:
step 3.1, unicast key negotiation requesting:
after the AAC and the REO complete the identity authentication processes, the AAC sends a unicast key negotiation request message to the REO to start a unicast key negotiation process with the REO, the unicast key negotiation request message comprising NAAc and MIC3;
wherein, the NAAC field indicates an challenge of the AAC, which is a random number generated by the AAC if the unicast key negotiation process is performed for the first time; or has a value the same as the NAAC field saved during the last unicast key negotiation process if the current unicast key is an updating process of a unicast key;
the MIC3 field indicates a message authentication code, which is a hash value calculated by the AAC by using a BK commonly owned by the AAC and the REO;
step 3.2, unicast key negotiation responding:
on receipt of the unicast key negotiation request message, the REO performs the following:
step 3.2.1, if the current key negotiation process is an updating process of a unicast key, the REO checks whether the NAAC field in the unicast key negotiation request message is in accordance with the NAAC saved during the last key negotiation process, if not, discards the unicast key negotiation request message, if so, go to step 3.2.2; if the current key negotiation process is not an updating process of a unicast key, go directly to step 3.2.2;

step 3.2.2, the REO verifies whether the MIC3 field is correct, if not, discards the unicast key negotiation request message, if so, go to step 3.2.3;
step a 3.2.3, the REO generates a REO challenge (NREQ), calculates a unicast session key and NAAC used for the next key negotiation process and stores the unicast session key and the NAAC, the unicast session key comprising a protocol data key (PDK) and a unicast data key (UDK);
the REO calculates MIC4 using the PDK, forms a unicast key negotiation
response message and sends it to the AAC;
the REO installs the newly negotiated unicast session key, the unicast key negotiation response message comprising NREQ, NAAC and MIC4,
wherein, the NREQ field indicates an challenge of the REO, which is a random number generated by the REO;
the NAAC field indicates an challenge of the AAC, and has a value the same as the value of the NAAC field in the unicast key negotiation request message; if the unicast key negotiation process is performed for the first time, the value of the NAAC field is determined directly by the value of the NAAC field in the unicast key negotiation request message; if it is an updating process of the unicast key, the value of the NAAC field is the value of the $N_{AAC}$ field saved during the last unicast key negotiation process;
the MIC4 field indicates a message authentication code, which is a hash value of all the other fields except the MIC4 field in the unicast key negotiation response message calculated by the REO using the generated PDK;
step 3.3, unicast key negotiation confirmation:
on receipt of the unicast key negotiation response message, the AAC performs the following:
step 3.3.1, if the current key negotiation process is an updating process of a unicast key, the AAC checks whether the NAAC field in the unicast key negotiation response message is in accordance with the NAAC saved during the last key negotiation process, if not, discards the unicast key negotiation response message, if so, go to step 3.3.2; f the current key negotiation process is not an updating process of a unicast key, the AAC checks whether the NAAC field value in the unicast key negotiation response message is in accordance with the NAAC field value in the unicast key negotiation request message; if not, discards the unicast key negotiation response message, if so, go to step 3.3.2;
step 3.3.2, the AAC calculates the unicast session key and the NAAC used for the next key negotiation according to the NREQ field and the NAAC field in the unicast key negotiation response message, stores them, the unicast session key comprising PDK and UDK;
step 3.3.3, the AAC verifies whether the MIC4 in the unicast key negotiation response message is correct using the PDK, if not, discards the unicast key negotiation response message, if not, go to step 3.3.4;
step 3.3.4, the AAC calculates MIC5 using the PDK, forms a unicast key negotiation confirmation message, and sends it to the REO;
step 3.3.5, the AAC installs the newly negotiated unicast session key by the AAC, and activates sending and receiving functions of the newly installed unicast session key to allow encryption and decryption of unicast data based on the new key; if the current unicast key negotiation process is an updating process, the AAC further deletes the old unicast session key, the unicast key negotiation confirmation message comprising NREQ and MIC5, wherein, the NREQ field indicates challenge of the REO, which is a random number generated by the REO; the NREQ field has a value the same as the value of the NREQ field in the unicast key negotiation response message;

the MIC5 field indicates a message authentication code, which is a hash value of all the other fields except the MIC5 field in the unicast key negotiation confirmation message calculated by the AAC using the generated PDK;

step 3.4, on receipt of the unicast key negotiation confirmation message, the REO performs the following:

step 3.4.1, the REO checks whether the NREQ field is the same as the NREQ field in the unicast key negotiation response message sent by the REO itself; if not, discards the unicast key negotiation confirmation message, if so, go to step 3.4.2;

step 3.4.2, the REO verifies whether the MIC5 in the unicast key negotiation confirmation message is correct using the PDK; if not, discards the unicast key negotiation confirmation message, if so, go to step 3.4.3;

step 3.4.3, the REO activates sending and receiving functions of the newly installed unicast session key to allow encryption and sending of unicast data based on the new key; if the current unicast key negotiation process is an updating process, the REO further deletes the old unicast session key.

7. The security access control method for a wired local area network according to claim 3, wherein step 3 comprises:

step 3.5, multicast key notification, the multicast key notification message comprising a key notification identifier KN, encrypted key data EMDK and MIC6;

wherein, the KN field indicates a key notification identifier, which is initialized as an integer and added by 1 for every key updating notification; if the notified key is unchanged, the KN field remains unchanged;

the EMDK field indicates encrypted key data, which is multicast data key (MDK) encrypted by the AAC using the PDK;

the MIC6 field indicates a message authentication code, which is a hash value of all the other fields except the MIC6 field in the multicast key notification message calculated by the AAC using the PDK generated during the unicast key negotiation;

step 3.6, multicast key responding:

on receipt of the multicast key notification message, the REO performs the following:

step 3.6.1, the REO checks whether the KN field is increased monotonically; if not, discards the multicast key notification message, if so, go to step 3.6.2;

step 3.6.2, the REO verifies whether the MIC6 field is correct using the PDK generated during the unicast key negotiation; if not, discards the multicast key notification message, if so, go to step 3.6.3;

step 3.6.3, the REO obtains the MDK by decrypting the EMDK field using the PDK generated during the unicast key negotiation;

step 3.6.4, the REO stores the current value of the KN field, and generates a multicast key response message and sends it to the AAC, the multicast key response message comprising KN and MIC7;

wherein, the KN field indicates a key notification identifier, and has a value the same as the value of the KN field in the multicast key notification message;

the MIC7 field indicates a message authentication code, which is a hash value of all the other fields except the MIC7 field in the multicast key confirmation message calculated by the REO using the PDK generated during the unicast key negotiation;

step 3.7, on receipt of the multicast key response message, the AAC performs the following:

step 3.7.1, the AAC compares whether the KN field is in accordance with the corresponding field in the multicast key notification message previously sent; if not, discards the multicast key response message, if so, go to step 3.7.2;

step 3.7.2, the AAC verifies whether the MIC7 field is correct using the PDK generated during the unicast key negotiation; if not, discards the multicast key response message, if so, obtains a multicast data key.

8. A security access control system for a wired local area network, wherein the security access control system for a wired local area network comprises a requester (REQ), an authentication access controller (AAC) and an authentication server (AS), both the REQ and the AS are connected to the AAC, the AAC provides a service interface for the REQ, and the AS provides authentication service for the REQ and the AAC, wherein a security policy negotiation is performed between the REQ and the AAC;

an identity authentication is performed between the REQ and the AAC; and a key negotiation is performed between the REQ and the AAC, wherein the security policy negotiation comprises:

step 1.1, security policy negotiation requesting:

when the REQ accesses the AAC, the AAC sends a security policy negotiation request message to the REQ, the security policy negotiation request message comprising $TIE_{AAC}$ wherein, the $TIE_{AAC}$ field indicates an information element of tri-element peer authentication (TePA) supported by the AAC, comprising an authentication and key management suite and a cryptography suite supported by the AAC;

step 1.2, security policy negotiation responding:

on receipt of the security policy negotiation request message, the REQ performs the following:

selecting an authentication and key management suite and a cryptography suite that are commonly owned by the REQ and the AAC according to the authentication and key management suite and the cryptography suite supported by the AAC indicated by the $TIE_{AAC}$ field in the security policy negotiation request message in conjunction with a local policy, and forming a security policy negotiation response message and sending it to the AAC; discarding the security policy negotiation request message according to a local policy if the REQ does not support any of the authentication and key management suite and the cryptography suite supported by the AAC in the security policy negotiation request message, the security policy negotiation response message comprising $TIE_{REQ}$ wherein, the $TIE_{REQ}$ field indicates a TePA information element selected by the REQ, comprising the authentication and key management suite and the cryptography suite selected by the REQ;

step 1.3, on receipt of the security policy negotiation response message, the AAC performs the following:

step 1.3.1, determining whether the AAC supports the authentication and key management suite and the cryptography suite selected by the REQ; if not, discarding the security policy negotiation response message, and if so, go to step 1.3.2;

step 1.3.2, starting a corresponding identity authentication process according to the authentication and key management suite selected by the REQ;

wherein in step 1.3.1, the authentication and key management suite selected by the REQ is a certificate-based authentication protocol Triple-element Authentication Extensible Protocol Certificate-based 1 An Authentication Protocol (TAEP-CAAP);

wherein when the authentication and key management suite selected by the REQ is TAEP-CAAP, the identity authentication comprises:

step 2.1, authentication activation:

the AAC sends an authentication activation message to the REQ to activate the REQ to perform certificate authentication, the authentication activation message comprising SNonce, $ID_{AS-AAC}$, $Cert_{AAC}$, $Para_{ECDH}$, $TIE_{AAC}$ and $SIG_{AAC}$;

wherein, the SNonce field indicates an authentication identifier, and is a random number generated by the AAC if the identity authentication process is performed for the first time; or an authentication identifier value generated from negotiation during the last identity authentication process if the current identity authentication process is an updating process;

the $ID_{AS-AAC}$ field indicates an identity ID of an authentication server (AS) trusted by the AAC, which is an ID of the AS who issued a certificate of the AAC ($Cert_{AAC}$);

the $Cert_{AAC}$ field indicates the certificate of the AAC;

the $Para_{ECDH}$ field indicates an elliptic curve cryptography parameter of an elliptic curve cryptography mechanism, which is an elliptic curve cryptography parameter used during calculation of Elliptic Curve Diffie-Hellman (ECDH) by the REQ and the AAC;

the $TIE_{AAC}$ field indicates an authentication and key management suite and a cryptography suite supported by the AAC, and has a value the same as the value of the $TIE_{AAC}$ field in the security policy negotiation request message;

the $SIG_{AAC}$ field indicates a signature by the AAC, which is a signature signed by the AAC using a private key on all the other fields except the $SIG_{AAC}$ field in the authentication activation message; the $SIG_{AAC}$ field is an optional field;

step 2.2, access authentication request:

on receipt of the authentication activation message, the REQ performs the following:

step 2.2.1, if the current identity authentication process is an updating process, the REQ checks whether the authentication identifier field value in the authentication activation message is in accordance with the authentication identifier saved during the last identity authentication process, if not, discards the authentication activation message, otherwise, go to step 2.2.2; if the current identity authentication process is not an updating process but an identity authentication process for the first time, go to step 2.2.2 directly;

step 2.2.2, the REQ verifies whether the $TIE_{AAC}$ field value is in accordance with the $TIE_{AAC}$ field value in the security policy negotiation request message received during the security policy negotiation; if not, discards the authentication activation message, if so, go to step 2.2.3;

step 2.2.3, if the $SIG_{AAC}$ field is comprised in the received authentication activation message, the REQ verifies correctness of the $SIG_{AAC}$ field; if the $SIG_{AAC}$ field is incorrect, discards the received authentication activation message, if the $SIG_{AAC}$ field is correct, go to step 2.2.4; if no $SIG_{AAC}$ field is comprised in the received authentication activation message, go directly to step 2.2.4;

step 2.2.4, the REQ selects a certificate of the REQ issued by the AS ($Cert_{REQ}$).

according to the $ID_{AS-AAC}$ field in the authentication activation message or selects a certificate of the REQ ($Cert_{REQ}$) according to a local policy; generates REQ key data x·P and a REQ challenge ($N_{REQ}$) for ECDH exchange; generates an access authentication request message and sends it to the AAC, the access authentication request message comprising SNonce, $N_{REQ}$, x·P, $ID_{AAC}$, $Cert_{REQ}$, $Para_{ECDH}$, $List_{AS-REQ}$, $TIE_{REQ}$ and $Sig_{REQ}$;

wherein, the SNonce field indicates an authentication identifier and has a value the same as the value of the SNonce field in the authentication activation message; if the identity authentication process is performed for the first time, the value of the SNonce field is determined directly by the value of the SNonce field in the authentication activation message; if the current identity authentication process is an updating process, the value of the SNonce field is the authentication identifier value calculated during the last identity authentication process;

the NREQ field indicates a REQ challenge, which is a random number generated by the REQ;

the x·P field indicates key data of the REQ, which is a temporary public key generated by the REQ for ECDH exchange;

the $ID_{AAC}$ field indicates an identity ID of the AAC, and is obtained according to the $Cert_{AAC}$ field in the authentication activation message;

the $Cert_{REQ}$ field indicates a certificate of the REQ;

the $Para_{ECDH}$ field indicates an ECDH parameter, which is an elliptic curve cryptography parameter used during ECDH calculation by the REQ and the AAC; and has a value the same as the value of the $Para_{ECDH}$ field in the authentication activation message;

the $List_{AS-REQ}$ field indicates a list of ASs trusted by the REQ, not comprising an issuer of the certificate of the REQ ($Cert_{REQ}$); the AAC is notified of by the REQ using the $List_{AS-REQ}$ field when the REQ trusts an entity other than the issuer of its certificate; the $List_{AS-REQ}$ field is an optional field;

the $TIE_{REQ}$ field indicates an authentication and key management suite and a cryptography suite selected by the REQ, and has a value the same as the value of the $TIE_{REQ}$ field in the security policy negotiation response message;

the $Sig_{REQ}$ field indicates a signature by the REQ, which is a signature signed by the REQ using a private key on all the other fields except the $Sig_{REQ}$ field in the access authentication request message.

9. The security access control method for a wired local area network according to claim 2, wherein when the authentication and key management suite selected by the REQ is TAEP-CAAP, the identity authentication further comprises:

step 2.3, certificate authentication requesting:

on receipt of the access authentication request message, the AAC performs the following:

step 2.3.1, if the AAC has sent the authentication activation message, the AAC checks whether the SNonce field value and the $Para_{ECDH}$ field value in the received access authentication request message are in accordance with the corresponding field values in the authentication activation message, if any of the SNonce field value and the $Para_{ECDH}$ field value is not, discards the access authentication request message, otherwise, got to step 2.3.2; if the AAC has not sent the authentication activation message, the AAC checks whether the SNonce field value is in accordance with the authentication identifier calculated during the last certificate authentication process and whether the $Para_{ECDH}$ field is in accordance with the $Para_{ECDH}$ field in the last authentication activation message, if any of the SNonce field value and the $Para_{ECDH}$ field is not, discards the access authentication request message, otherwise, go to step 2.3.2;

step 2.3.2, the AAC checks whether the $ID_{AAC}$ is in accordance with the identity of the AAC itself and whether the $TIE_{REQ}$ field value is in accordance with the $TIE_{REQ}$ field value in the security policy negotiation response message received during the security policy negotiation; if any of the $ID_{AAC}$ and the $TIE_{REQ}$ field value is not, discards the access authentication request message; otherwise, go to step 2.3.3;

step 2.3.3, the AAC verifies correctness of the $Sig_{REQ}$ field; if the $Sig_{REQ}$ field is incorrect, discards the access authentication request message; otherwise, go to step 2.3.4;

step 2.3.4, if it is required according to a local policy of the AAC to use the AS to authenticate the certificate of the REQ ($Cert_{REQ}$), the AAC generates a certificate authentication request message and sends it to the AS; otherwise, go to step 2.3.5;

step 2.3.5, the AAC authenticates the certificate of the REQ ($Cert_{REQ}$) locally, which comprises validating a verification result of the certificate of the REQ ($Cert_{REQ}$) according to a verification result of the certificate of the REQ ($Cert_{REQ}$) cached locally and timeliness defined by a local policy; if the verification result of the $Cert_{REQ}$ is valid, locally generates key data and an AAC challenge ($N_{AAC}$) for ECDH exchange, the key data comprising a temporary public key y·P of the AAC, performs ECDH calculation according to the temporary public key x·P of the REQ and a temporary private key y of the AAC to obtain a base key (BK) and an authentication identifier for the next identity authentication process and store them, sets an access result to be successful, forms an access authentication response message and sends it to the REQ, and permits a user to access the network; if the verification result of the $Cert_{REQ}$ is invalid, the AAC sets the access result to be unsuccessful and the AAC challenge ($N_{AAC}$) and the key data y·P to be any values, forms an access authentication response message and sends it to the REQ, and removes association with the REQ, the certificate authentication request message comprises: $N_{AAC}$, $N_{REQ}$, $Cert_{REQ}$, $Cert_{AAC}$ and $List_{AS-REQ}$;

wherein, the $N_{AAC}$ field indicates an AAC challenge, which is a random number generated by the AAC;

the $N_{REQ}$ field indicates REQ challenge, which is a random number generated by the REQ, and has a value the same as the value of the $N_{REQ}$ field in the access authentication request message sent by the REQ;

the $Cert_{REQ}$ field indicates a certificate of the REQ and has a value the same as the value of the $Cert_{REQ}$ field in the access authentication request message;

the $Cert_{AAC}$ field indicates a certificate of the AAC and has a value the same as the value of the $Cert_{AAC}$ field in the authentication activation message;

the $List_{AS-REQ}$ field indicates a list of ASs trusted by the REQ and has a value the same as the value of the $List_{AS-REQ}$ field in the access authentication request message sent by the REQ; the $List_{AS-REQ}$ field is an optional field;

step 2.4, certificate authentication responding:

on receipt of the certificate authentication request message, the AS performs the following:

step 2.4.1, in the case of unilateral authentication, the AS verifies the certificate of the REQ ($Cert_{REQ}$); in the case of mutual authentication, the AS verifies both the certificate of the AAC ($Cert_{AAC}$) and the certificate of the REQ ($Cert_{REQ}$), the verification of the certificates are performed with reference to RFC3280, and if the verification cannot be performed, the AS sets a verification result of a corresponding certificate to be issuer of the certificate undefined, otherwise, the AS verifies the certificate and performs step 2.4.2;

step 2.4.2, the AS forms a certificate authentication response message according to the verification result of the certificate; adds a corresponding signature and sends the certificate authentication response message to the AAC, the certificate authentication response message comprising $RES_{cert}$, $SIG_{AS-REQ}$ and $SIG_{AS-AAC}$, wherein the $RES_{cert}$ field indicates the verification result of the certificate and comprises an AAC challenge value ($N_{AAC}$), a REQ challenge value ($N_{REQ}$), the verification result of the $Cert_{AAC}$ and the verification result of the $Cert_{REQ}$; in case of unilateral verification, the $RES_{cert}$ field does not comprise the verification result of the certificate of the AAC ($Cert_{AAC}$);

the $SIG_{AS-REQ}$ field indicates a signature signed by the AS trusted by the REQ on the verification result of the certificate ($RES_{cert}$) in the certificate authentication response message;

the $SIG_{AS-AAC}$ field indicates a signature signed by the AS trusted by the AAC on all the other fields in the certificate authentication response message except the $SIG_{AS-AAC}$ field; the $SIG_{AS-AAC}$ field is an optional field, and is omitted if the AS who signed the verification result of the certificate is the same as the AS trusted by the AAC;

step 2.5. access authentication responding:

on receipt of the certificate authentication response message, the AAC performs the following:

step 2.5.1, the AAC checks whether the AAC challenge ($N_{AAC}$) field value in the $RES_{cert}$ field is the same as the NAAC field value in the certificate authentication request message; if not, discards the certificate authentication response message, if so, go to step 2.5.2;

step 2.5.2, if two signature fields are comprised in the certificate authentication response message, the AAC checks whether the $SIG_{AS-AAC}$ field is correct, if not, discards the certificate authentication response message, if so, go to step 2.5.3; if only one signature field is comprised in the certificate authentication response message, which indicates that the AS trusted by the REQ is also the AS trusted by the AAC, the AAC checks whether the $SIG_{AS-REQ}$ field is correct, if not, discards the certificate authentication response message, if so, go to step 2.5.3;

step 2.5.3, the AAC checks whether the verification result of the $Cert_{REQ}$ in the $RES_{cert}$ field is valid; if so, locally generates key data y·P and an AAC challenge ($N_{AAC}$) for ECDH exchange, performing ECDH calculation according to the temporary public key x·P of the REQ and a temporary private key y of the AAC to obtain a base key (BK) and an authentication identifier for the next identity authentication process and store them, sets an access result to be successful, forms an access authentication response message and sends it to the REQ, and permits a user to access the network; if the verification result of the $Cert_{REQ}$ is invalid, the AAC sets the access result to be unsuccessful, the AAC challenge ($N_{AAC}$) and the private data y·P to be any value, forms an access authentication response message and sends it to the REQ, and remove association with the REQ, the access authentication response message comprising $N_{REQ}, N_{AAC}, ACC_{RES}, x \cdot P, y \cdot P, ID_{AAC}, ID_{REQ}, MRES_{cert}$ and $SIG_{AAC}$ or MIC1, wherein, the NREQ field indicates a REQ challenge, which is a random number generated by the REQ; the $N_{REQ}$ field is an optional field, it is comprised in the access authentication response message only in the case of unilateral authentication; and if the $N_{REQ}$ field exists, it has a value the same as the value of the $N_{REQ}$ field in the access authentication request message sent by the REQ;

the $N_{AAC}$ field indicates an AAC challenge, which is a random number generated by the AAC; the $N_{AAC}$ field is an optional field, it is comprised in the access authentication response message only in the case of unilateral authentication; and if the $N_{AAC}$ field exists, it has a value the value of the $N_{AAC}$ field in the access authentication request message sent by the AAC;

the $ACC_{RES}$ field indicates an access result, which is access success or access failure and a reason of the failure set by the AAC according to the authentication result;

the x·P field indicates key data of the REQ, which is a temporary public key generated by the REQ for ECDH exchange; the x·P field has a value the same as the value of the x·P field in the access authentication request message sent by the REQ;

the y·P field indicates key data of the AAC, which is a temporary public key generated by the AAC for ECDH exchange;

the $ID_{AAC}$ field indicates an identity ID of the AAC and is obtained according to the $Cert_{AAC}$ field;

the IDREQ field indicates an identity ID of the REQ and is obtained according to the $Cert_{REQ}$ field in the received access authentication request message;

the $MRES_{cert}$ field indicates a combined certificate verification result; the $MRES_{cert}$ field is an optional field, it is comprised in the access authentication response message only in the case of unilateral authentication; if the $MRES_{cert}$ field exists, it comprises the fields in the certificate authentication response message and the same values;

the $SIG_{AAC}$ field indicates a signature of the AAC, which is a signature signed by the AAC using a private key of the AAC on all the other fields except the $SIG_{AAC}$ field in the access authentication response message;

the MIC1 field indicates a message authentication code, which is a hash value of all the other fields except the MIC1 field in the access authentication response message and an authentication identifier for the next certificate authentication process calculated by the AAC using the BK generated from negotiation during the authentication;

the access authentication response message comprises one or more of the $SIG_{AAC}$ field and the MIC1 field; if the authentication activation message exists in the current identity authentication process and if the access authentication activation message comprises the $SIG_{AAC}$ field, the authentication response message comprises only the MIC1 field;

if no authentication activation message exists in the current identity authentication or if the authentication activation message does not comprise a $SIG_{AAC}$ field, the access authentication response message comprises only the $SIG_{AAC}$ field;

step 2.6, access authentication confirmation:
on receipt of the access authentication response message, the REQ performs the following:

step 2.6.1, the REQ determines whether the received access authentication response message corresponds to the current access authentication request message according to the $ID_{AAC}$ field and the $ID_{REQ}$ field in the access authentication response message; if not, discards the received access authentication response message; if so, go to step 2.6.2;

step 2.6.2, the REQ determines whether the REQ key data field x·P value in the access authentication response message is in accordance with the x·P field value in the access authentication request message sent by the REQ itself; if not, discards the access authentication response message, otherwise, go to step 2.6.3;

step 2.6.3, in the case of unilateral authentication, the REQ determines whether the $N_{REQ}$ field value is in accordance with the $N_{REQ}$ field value in the access authentication request message sent previously; if not, discards the access authentication response message, otherwise, go to step 2.6.4; in the case of mutual authentication, go directly to step 2.6.4;

step 2.6.4, the REQ checks the $ACC_{RES}$ field in the access authentication response message;

if the access result is unsuccessful, removes association with the AAC, otherwise, go to step 2.6.5;

step 2.6.5, if the received access authentication response message comprises the $SIG_{AAC}$ field, the REQ verifies correctness of the $SIG_{AAC}$ field, if the $SIG_{AAC}$ is incorrect, discards the access authentication response message, otherwise, go to step 2.6.6;

if the received access authentication response message comprises the MIC1 field, the REQ verifies correctness of the MIC1 field, if the MIC1 field is incorrect, discards the access authentication response message, otherwise, go to step 2.6.6;

step 2.6.6, in the case of unilateral authentication, go to step 2.6.8; otherwise, the REQ verifies whether the $N_{REQ}$ field value comprised in the $MRES_{cert}$ field is in accordance with the $N_{REQ}$ field value in the access authentication request message sent by the REQ itself, if not, discards the access authentication response message, if so, verifies whether the $SIG_{AS-REQ}$ is correct, if not, discards the access authentication response message, if so, go to step 2.6.7;

step 2.6.7, the REQ verifies whether the AAC certificate verification result in the $MRES_{cert}$ field is valid; if not, it is determined that the network is invalid and should not be accessed, otherwise, it is determined that the network is valid and can be accessed, and go to step 2.6.8;

step 2.6.8, the REQ performs ECDH calculation according to the temporary public key y·P of the AAC and the temporary private key x of the REQ to obtain a BK and an authentication identifier for the next certificate authentication process, and stores the BK and the authentication identifier;

step 2.6.9, if the received access authentication response message comprises the $SIG_{AAC}$ field, sending an access authentication confirmation message is optional; if the received access authentication response message comprises the MIC1 field, the REQ forms an access authentication confirmation message and sends it to the AAC, the access authentication confirmation message comprising MIC2, wherein, the MIC2 field indicates a message authentication code, which is a hash value of the AAC challenge value ($N_{AAC}$), the REQ challenge value ($N_{REQ}$) and an authentication identifier for the next certificate authentication process calculated by the REQ using the BK generated from negotiation during the authentication.

10. The security access control method for a wired local area network according to claim 9, wherein in step 2.5.3, if the SIGAAc field is comprised in the access authentication response message sent by the AAC, the AAC waits to receive the access authentication confirmation message after sending the access authentication response message to the REO.

11. The security access control method for a wired local area network according to claim 9, wherein in step 2.6.9, on receipt of the access authentication confirmation message sent by the REO, the AAC verifies correctness of the MIC2 field in the access authentication confirmation message, if the MIC2 field is correct, then the REO has a BK in accordance with the AAC; if the MIC2 field is incorrect, the AAC discards the access authentication response message.

12. The security access control method for a wired local area network according to claim 9, wherein step 3 the key negotiation comprises:
  step 3.1, unicast key negotiation requesting:
    after the AAC and the REO complete the identity authentication processes, the AAC sends a unicast key negotiation request message to the REO to start a unicast key negotiation process with the REO, the unicast key negotiation request message comprising NAAC and MIC3;
    wherein, the NAAC field indicates an challenge of the AAC, which is a random number generated by the AAC if the unicast key negotiation process is performed for the first time; or has a value the same as the NAAC field saved during the last unicast key negotiation process if the current unicast key is an updating process of a unicast key;
    the MIC3 field indicates a message authentication code, which is a hash value calculated by the AAC by using a BK commonly owned by the AAC and the REO;
  step 3.2, unicast key negotiation responding:
    on receipt of the unicast key negotiation request message, the REO performs the following:
    step 3.2.1, if the current key negotiation process is an updating process of a unicast key, the REO checks whether the NAAC field in the unicast key negotiation request message is in accordance with the NAAC saved during the last key negotiation process, if not, discards the unicast key negotiation request message, if so, go to step 3.2.1; if the current key negotiation process is not an updating process of a unicast key, go directly to step 3.2.2;
    step 3.2.2, the REO verifies whether the MIC3 field is correct, if not, discards the unicast key negotiation request message, if so, go to step 3.2.3;
    step 3.2.3, the REO generates a REO challenge (NREO), calculates a unicast session key and NAAC used for the next key negotiation process and stores the unicast session key and the NAAC, the unicast session key comprising a protocol data key (PDK) and a unicast data key (UDK);
    the REO calculates MIC4 using the PDK, forms a unicast key negotiation response message and sends it to the AAC;
    the REO installs the newly negotiated unicast session key, the unicast key negotiation response message comprising NREO, NAAC and MIC4,
    wherein, the NREO field indicates an challenge of the REO, which is a random number generated by the REO;
    the NAAC field indicates an challenge of the AAC, and has a value the same as the value of the NAAC field in the unicast key negotiation request message; if the unicast key negotiation process is performed for the first time, the value of the NAAC field is determined directly by the value of the NAAC field in the unicast key negotiation request message; if it is an updating process of the unicast key, the value of the NAAC field is the value of the NAAC field saved during the last unicast key negotiation process;
    the MIC4 field indicates a message authentication code, which is a hash value of all the other fields except the MIC4 field in the unicast key negotiation response message calculated by the REO using the generated PDK;
  step 3.3, unicast key negotiation confirmation:
    on receipt of the unicast key negotiation response message, the AAC performs the following:
    step 3.3.1, if the current key negotiation process is an updating process of a unicast key, the AAC checks whether the NAAC field in the unicast key negotiation response message is in accordance with the NAAC saved during the last key negotiation process, if not, discards the unicast key negotiation response message, if so, go to step 3.3.2; if the current key negotiation process is not an updating process of a unicast key, the AAC checks whether the NAAC field value in the unicast key negotiation response message is in accordance with the NAAC field value in the unicast key negotiation request message; if not, discards the unicast key negotiation response message, if so, go to step 3.3.2;
    step 3.3.2, the AAC calculates the unicast session key and the NAAC used for the next key negotiation according to the NREQ field and the NAAC field in the unicast key negotiation response message, stores them, the unicast session key comprising PDK and UDK;
    step 3.3.3, the AAC verifies whether the MIC4 in the unicast key negotiation response message is correct using the PDK, if not, discards the unicast key negotiation response message, if not, go to step 3.3.4;
    step 3.3.4, the AAC calculates MIC5 using the PDK, forms a unicast key negotiation confirmation message, and sends it to the REO;
    step 3.3.5, the AAC installs the newly negotiated unicast session key by the AAC, and activates sending and receiving functions of the newly installed unicast session key to allow encryption and decryption of unicast data based on the new key; if the current unicast key negotiation process is an updating process, the AAC further deletes the old unicast session key, the unicast key negotiation confirmation message comprising NREQ and MIC5, wherein, the NREQ field indicates challenge of the REO, which is a random number generated by the REO; the NREQ field has a value the same as the value of the NREQ field in the unicast key negotiation response message;
    the MIC5 field indicates a message authentication code, which is a hash value of all the other fields except the MIC5 field in the unicast key negotiation confirmation message calculated by the AAC using the generated PDK;
  step 3.4, on receipt of the unicast key negotiation confirmation message, the REO performs the following:
    step 3.4.1, the REO checks whether the NREQ field is the same as the NREQ field in the unicast key negotiation response message sent by the REO itself; if not, discards the unicast key negotiation confirmation message, if so, go to step 3.4.2;

step 3.4.2, the REO verifies whether the MIC5 in the unicast key negotiation confirmation message is correct using the PDK; if not, discards the unicast key negotiation confirmation message, if so, go to step 3.4.3;

step 3.4.3, the REO activates sending and receiving functions of the newly installed unicast session key to allow encryption and sending of unicast data based on the new key; if the current unicast key negotiation process is an updating process, the REO further deletes the old unicast session key.

13. The security access control method for a wired local area network according to claim 9, wherein step 3 the key negotiation comprises:

step 3.5, multicast key notification, the multicast key notification message comprising a key notification identifier KN, encrypted key data EMDK and MIC6;

wherein, the KN field indicates a key notification identifier, which is initialized as an integer and added by 1 for every key updating notification; if the notified key is unchanged, the KN field remains unchanged;

the EMDK field indicates encrypted key data, which is multicast data key (MDK) encrypted by the AAC using the PDK;

the MIC6 field indicates a message authentication code, which is a hash value of all the other fields except the MIC6 field in the multicast key notification message calculated by the AAC using the PDK generated during the unicast key negotiation;

step 3.6, multicast key responding:

on receipt of the multicast key notification message, the REO performs the following:

step 3.6.1, the REO checks whether the KN field is increased monotonically; if not, discards the multicast key notification message, if so, go to step 3.6.2;

step 3.6.2, the REO verifies whether the MIC6 field is correct using the PDK generated during the unicast key negotiation; if not, discards the multicast key notification massage, if so, go to step 3.6.3;

step 3.6.3, the REO obtains the MDK by decrypting the EMDK field using the PDK generated during the unicast key negotiation;

step 3.6.4, the REO stores the current value of the KN field, and generates a multicast key response message and sends it to the AAC, the multicast key response message comprising KN and MIC?;

wherein, the KN field indicates a key notification identifier, and has a value the same as the value of the KN field in the multicast key notification message;

the MIG7 field indicates a message authentication code, which is a hash value of all the other fields except the MIG7 field in the multicast key confirmation message calculated by the REO using the PDK generated during the unicast key negotiation;

step 3.7, on receipt of the multicast key response message, the AAG performs the following:

step 3.7.1, the AAG compares whether the KN field is in accordance with the corresponding field in the multicast key notification message previously sent; if not, discards the multicast key response message, if so, go to step 3.7.2;

step 3.7.2, the AAG verifies whether the MIG7 field is correct using the PDK generated during the unicast key negotiation; if not, discards the multicast key response message, if so, obtains a multicast data key.

* * * * *

UNITED STATES PATENT AND TRADEMARK OFFICE
CERTIFICATE OF CORRECTION

PATENT NO. : 8,689,283 B2  
APPLICATION NO. : 13/391051  
DATED : April 1, 2014  
INVENTOR(S) : Manxia Tie et al.

It is certified that error appears in the above-identified patent and that said Letters Patent is hereby corrected as shown below:

In the Claims:

At column 23, claim 1, line number 26, delete "$SIG_{AAC}$-" and insert --$SIG_{AAC}$--

At column 24, claim 1, line number 15, delete "(NREQ)" and insert --($N_{REQ}$)--

At column 24, claim 1, line number 19, delete "$LIST_{AS\_REQ}$" and insert --$List_{AS\text{-}REQ}$--

At column 24, claim 1, line number 19, delete "$Sig_{REQ}$-" and insert --$Sig_{REQ}$--

At column 24, claim 1, line number 30, delete "NREQ" and insert --$N_{REQ}$--

At column 24, claim 1, line number 38, delete "$Cert_{REO}$" and insert --$Cert_{REQ}$--

At column 24, claim 1, line number 46, delete "$Cert_{REO}$" and insert --$Cert_{REQ}$--

At column 25, claim 3, line number 66, delete "NREQ" and insert --$N_{REQ}$--

At column 26, claim 3, line number 30, delete "$RES_{Cert}$" and insert --$RES_{Cert}$--

At column 26, claim 3, line number 33, delete "NAAc" and insert --$N_{AAC}$--

At column 26, claim 3, line number 35, delete "$RES_{Cert}$" and insert --$RES_{Cert}$--

At column 26, claim 3, line number 40, delete "$RES_{Cert}$" and insert --$RES_{Cert}$--

At column 27, claim 3, line number 61, delete "MICI" and insert --MIC1--

At column 27, claim 3, line number 63, delete "MICI" and insert --MIC1--

Signed and Sealed this  
Eighth Day of July, 2014

Michelle K. Lee  
*Deputy Director of the United States Patent and Trademark Office*

At column 28, claim 3, line number 2, delete "MICl" and insert --MIC1--

At column 28, claim 3, line number 7, delete "MICl" and insert --MIC1--

At column 28, claim 3, line number 47, delete "MICl" and insert --MIC1--

At column 28, claim 3, line number 48, delete "of the MICl" and insert --of the MIC1--

At column 28, claim 3, line number 48, delete "if the MICl" and insert --if the MIC1--

At column 29, claim 4, line number 21, delete "SIGAAc" and insert --$SIG_{AAC}$--

At column 29, claim 4, line number 26, delete "REO" and insert --REQ--

At column 29, claim 5, line number 31, delete "REO" and insert --REQ--

At column 29, claim 5, line number 33, delete "REO" and insert --REQ--

At column 29, claim 6, line number 41, delete "REO" and insert --REQ--

At column 29, claim 6, line number 43, delete "REO" and insert --REQ--

At column 29, claim 6, line number 44, delete "REO" and insert --REQ--

At column 29, claim 6, line number 45, delete "NAAc" and insert --$N_{AAC}$--

At column 29, claim 6, line number 46, delete "NAAC" and insert --$N_{AAC}$--

At column 29, claim 6, line number 49, delete "NAAC" and insert --$N_{AAC}$--

At column 29, claim 6, line number 55, delete "REO" and insert --REQ--

At column 29, claim 6, line number 58, delete "REO" and insert --REQ--

At column 29, claim 6, line number 60, delete "REO" and insert --REQ--

At column 29, claim 6, line number 61, delete "NAAC" and insert --$N_{AAC}$--

At column 29, claim 6, line number 62, delete "NAAC" and insert --$N_{AAC}$--

At column 30, claim 6, line number 1, delete "REO" and insert --REQ--

At column 30, claim 6, line number 4, delete "the REO" and insert --the REQ--

At column 30, claim 6, line number 4, delete "a REO" and insert --a REQ--

At column 30, claim 6, line number 4, delete "(NREQ)" and insert --($N_{REQ}$)--

At column 30, claim 6, line number 5, delete "NAAC" and insert --$N_{AAC}$--

At column 30, claim 6, line number 7, delete "NAAC" and insert --$N_{AAC}$--

At column 30, claim 6, line number 10, delete "REO" and insert --REQ--

At column 30, claim 6, line number 13, delete "REO" and insert --REQ--

At column 30, claim 6, line number 15, delete "NREQ" and insert --$N_{REQ}$--

At column 30, claim 6, line number 15, delete "NAAC" and insert --$N_{AAC}$--

At column 30, claim 6, line number 16, delete "NREQ" and insert --$N_{REQ}$--

At column 30, claim 6, line number 17, delete "REO" and insert --REQ--

At column 30, claim 6, line number 17, delete "the REO" and insert --the REQ--

At column 30, claim 6, line number 18, delete "NAAC" and insert --$N_{AAC}$--

At column 30, claim 6, line number 19, delete "NAAC" and insert --$N_{AAC}$--

At column 30, claim 6, line number 22, delete "NAAC" and insert --$N_{AAC}$--

At column 30, claim 6, line number 23, delete "NAAC" and insert --$N_{AAC}$--

At column 30, claim 6, line number 25, delete "NAAC" and insert --$N_{AAC}$--

At column 30, claim 6, line number 31, delete "REO" and insert --REQ--

At column 30, claim 6, line number 37, delete "NAAC" and insert --$N_{AAC}$--

At column 30, claim 6, line number 38, delete "NAAC" and insert --$N_{AAC}$--

At column 30, claim 6, line number 43, delete "NAAC" and insert --$N_{AAC}$--

At column 30, claim 6, line number 45, delete "NAAC" and insert --$N_{AAC}$--

At column 30, claim 6, line number 49, delete "NAAC" and insert --$N_{AAC}$--

At column 30, claim 6, line number 50, delete "NREQ" and insert --$N_{REQ}$--

At column 30, claim 6, line number 50, delete "NAAC" and insert --$N_{AAC}$--

CERTIFICATE OF CORRECTION (continued)
U.S. Pat. No. 8,689,283 B2

At column 30, claim 6, line number 59, delete "REO" and insert --REQ--

At column 31, claim 6, line number 1, delete "NREQ" and insert --$N_{REQ}$--

At column 31, claim 6, line number 1, delete "the NREQ" and insert --the $N_{REQ}$--

At column 31, claim 6, line number 2, delete "REO" and insert --REQ--

At column 31, claim 6, line number 3, delete "REO" and insert --REQ--

At column 31, claim 6, line number 3, delete "NREQ" and insert --$N_{REQ}$--

At column 31, claim 6, line number 4, delete "NREQ" and insert --$N_{REQ}$--

At column 31, claim 6, line number 12, delete "REO" and insert --REQ--

At column 31, claim 6, line number 13, delete "REO" and insert --REQ--

At column 31, claim 6, line number 13, delete "NREQ" and insert --$N_{REQ}$--

At column 31, claim 6, line number 14, delete "NREQ" and insert --$N_{REQ}$--

At column 31, claim 6, line number 15, delete "REO" and insert --REQ--

At column 31, claim 6, line number 18, delete "REO" and insert --REQ--

At column 31, claim 6, line number 22, delete "REO" and insert --REQ--

At column 31, claim 6, line number 26, delete "REO" and insert --REQ--

At column 31, claim 7, line number 32, delete "EMDK" and insert --$E_{MDK}$--

At column 31, claim 7, line number 37, delete "EMDK" and insert --$E_{MDK}$--

At column 31, claim 7, line number 47, delete "REO" and insert --REQ--

At column 31, claim 7, line number 48, delete "REO" and insert --REQ--

At column 31, claim 7, line number 51, delete "REO" and insert --REQ--

At column 31, claim 7, line number 55, delete "REO" and insert --REQ--

At column 31, claim 7, line number 56, delete "EMDK" and insert --$E_{MDK}$--

At column 31, claim 7, line number 58, delete "REO" and insert --REQ--

CERTIFICATE OF CORRECTION (continued)
U.S. Pat. No. 8,689,283 B2

At column 32, claim 7, line number 2, delete "REO" and insert --REQ--

At column 34, claim 8, line number 2, delete "($Cert_{REQ}$)." and insert --($Cert_{REQ}$)--

At column 34, claim 8, line number 22, delete "NREQ" and insert --$N_{REQ}$--

At column 37, claim 9, line number 6, delete "NREQ" and insert --$N_{REQ}$--

At column 37, claim 9, line number 35, delete "IDREQ" and insert --$ID_{REQ}$--

At column 37, claim 9, line number 42, delete "$MRES_{Cer}$t" and insert --$MRES_{Cert}$--

At column 39, claim 10, line number 8, delete "$SIGAA_C$" and insert --$SIG_{AAC}$--

At column 39, claim 10, line number 11, delete "REO" and insert --REQ--

At column 39, claim 11, line number 15, delete "REO" and insert --REQ--

At column 39, claim 11, line number 17, delete "REO" and insert --REQ--

At column 39, claim 12, line number 24, delete "REO" and insert --REQ--

At column 39, claim 12, line number 26, delete "REO" and insert --REQ--

At column 39, claim 12, line number 27, delete "REO" and insert --REQ--

At column 39, claim 12, line number 28, delete "NAAC" and insert --$N_{AAC}$--

At column 39, claim 12, line number 29, delete "NAAC" and insert --$N_{AAC}$--

At column 39, claim 12, line number 32, delete "NAAC" and insert --$N_{AAC}$--

At column 39, claim 12, line number 38, delete "REO" and insert --REQ--

At column 39, claim 12, line number 41, delete "REO" and insert --REQ--

At column 39, claim 12, line number 43, delete "REO" and insert --REQ--

At column 39, claim 12, line number 44, delete "NAAC" and insert --$N_{AAC}$--

At column 39, claim 12, line number 45, delete "NAAC" and insert --$N_{AAC}$--

At column 39, claim 12, line number 51, delete "REO" and insert --REQ--

At column 39, claim 12, line number 54, delete "the REO" and insert --the REQ--

At column 39, claim 12, line number 54, delete "a REO" and insert --a REQ--

At column 39, claim 12, line number 54, delete "(NREO)" and insert --($N_{REQ}$)--

At column 39, claim 12, line number 55, delete "NAAC" and insert --$N_{AAC}$--

At column 39, claim 12, line number 57, delete "NAAC" and insert --$N_{AAC}$--

At column 39, claim 12, line number 60, delete "REO" and insert --REQ--

At column 39, claim 12, line number 63, delete "REO" and insert --REQ--

At column 39, claim 12, line number 65, delete "NREO" and insert --$N_{REQ}$--

At column 39, claim 12, line number 65, delete "NAAC" and insert --$N_{AAC}$--

At column 39, claim 12, line number 66, delete "NREO" and insert --$N_{REQ}$--

At column 39, claim 12, line number 67, delete "REO" and insert --REQ--

At column 39, claim 12, line number 67, delete "the REO" and insert --the REQ--

At column 40, claim 12, line number 1, delete "NAAC" and insert --$N_{AAC}$--

At column 40, claim 12, line number 2, delete "NAAC" and insert --$N_{AAC}$--

At column 40, claim 12, line number 5, delete "NAAC" and insert --$N_{AAC}$--

At column 40, claim 12, line number 6, delete "NAAC" and insert --$N_{AAC}$--

At column 40, claim 12, line number 8, delete "NAAC" and insert --$N_{AAC}$--

At column 40, claim 12, line number 9, delete "NAAC" and insert --$N_{AAC}$--

At column 40, claim 12, line number 14, delete "REO" and insert --REQ--

At column 40, claim 12, line number 20, delete "NAAC" and insert --$N_{AAC}$--

At column 40, claim 12, line number 21, delete "NAAC" and insert --$N_{AAC}$--

At column 40, claim 12, line number 26, delete "NAAC" and insert --$N_{AAC}$--

At column 40, claim 12, line number 28, delete "NAAC" and insert --$N_{AAC}$--

At column 40, claim 12, line number 32, delete "NAAC" and insert --$N_{AAC}$--

At column 40, claim 12, line number 33, delete "NREQ" and insert --$N_{REQ}$--

At column 40, claim 12, line number 33, delete "NAAC" and insert --$N_{AAC}$--

At column 40, claim 12, line number 42, delete "REO" and insert --REQ--

At column 40, claim 12, line number 51, delete "NREQ" and insert --$N_{REQ}$--

At column 40, claim 12, line number 51, delete "the NREQ" and insert --the $N_{REQ}$--

At column 40, claim 12, line number 52, delete "REO" and insert --REQ--

At column 40, claim 12, line number 53, delete "REO" and insert --REQ--

At column 40, claim 12, line number 53, delete "NREQ" and insert --$N_{REQ}$--

CERTIFICATE OF CORRECTION (continued)
U.S. Pat. No. 8,689,283 B2

At column 40, claim 12, line number 54, delete "NREQ" and insert --$N_{REQ}$--

At column 40, claim 12, line number 62, delete "REO" and insert --REQ--

At column 40, claim 12, line number 63, delete "REO" and insert --REQ--

At column 40, claim 12, line number 63, delete "NREQ" and insert --$N_{REQ}$--

At column 40, claim 12, line number 64, delete "NREQ" and insert --$N_{REQ}$--

At column 40, claim 12, line number 65, delete "REO" and insert --REQ--

At column 41, claim 12, line number 1, delete "REO" and insert --REQ--

At column 41, claim 12, line number 5, delete "REO" and insert --REQ--

At column 41, claim 12, line number 9, delete "REO" and insert --REQ--

At column 41, claim 13, line number 11, delete "step 3"

At column 41, claim 13, line number 31, delete "REO" and insert --REQ--

At column 41, claim 13, line number 32, delete "REO" and insert --REQ--

At column 42, claim 13, line number 1, delete "REO" and insert --REQ--

At column 42, claim 13, line number 5, delete "REO" and insert --REQ--

At column 42, claim 13, line number 8, delete "REO" and insert --REQ--

At column 42, claim 13, line number 12, delete "MIC?" and insert --MIC7--

At column 42, claim 13, line number 16, delete "MIG7" and insert --MIC7--

At column 42, claim 13, line number 18, delete "MIG7" and insert --MIC7--

At column 42, claim 13, line number 19, delete "REO" and insert --REQ--

At column 42, claim 13, line number 28, delete "MIG7" and insert --MIC7--